US012091517B2

(12) United States Patent
Merrill et al.

(10) Patent No.: US 12,091,517 B2
(45) Date of Patent: *Sep. 17, 2024

(54) COMPOSITION AND FILMS COMPRISING POLYLACTIC ACID POLYMER AND COPOLYMER COMPRISING LONG CHAIN ALKYL MOIETY

(71) Applicant: 3M INNOVATIVE PROPERTIES COMPANY, St. Paul, MN (US)

(72) Inventors: William W. Merrill, Mahtomedi, MN (US); Jeffrey P. Kalish, St. Paul, MN (US); Jacob D. Young, St. Paul, MN (US); Ramesh C. Kumar, Woodbury, MN (US); Sonja S. Mackey, St. Paul, MN (US); Kanta Kumar, Woodbury, MN (US); Adam R. Wohl, Mahtomedi, MN (US); David J. Kinning, Woodbury, MN (US); Michael D. Crandall, Sparks, NV (US); Ignatius A. Kadoma, Cottage Grove, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 1369 days.

This patent is subject to a terminal disclaimer.

(21) Appl. No.: 16/461,013

(22) PCT Filed: Nov. 29, 2017

(86) PCT No.: PCT/US2017/063557
§ 371 (c)(1),
(2) Date: May 15, 2019

(87) PCT Pub. No.: WO2018/106486
PCT Pub. Date: Jun. 14, 2018

(65) Prior Publication Data
US 2019/0284357 A1    Sep. 19, 2019

Related U.S. Application Data

(60) Provisional application No. 62/430,012, filed on Dec. 5, 2016.

(51) Int. Cl.
*C08J 5/18* (2006.01)
*B29C 33/68* (2006.01)
(Continued)

(52) U.S. Cl.
CPC ............. *C08J 5/18* (2013.01); *B29C 33/68* (2013.01); *B32B 7/06* (2013.01); *B32B 7/12* (2013.01);
(Continued)

(58) Field of Classification Search
None
See application file for complete search history.

(56) References Cited

U.S. PATENT DOCUMENTS

| 2,532,011 A | 11/1950 | Dalquist |
| 2,607,711 A | 8/1952 | Hendriks |

(Continued)

FOREIGN PATENT DOCUMENTS

| CN | 1501992 | 6/2004 |
| CN | 101868502 | 8/2008 |

(Continued)

OTHER PUBLICATIONS

Ikada, "Stereocomplex Formation Between Enantiomeric Poly(lactides)", Macromolecules, 1987, vol. 20, No. 04, pp. 904-906.

(Continued)

*Primary Examiner* — Vivian Chen
(74) *Attorney, Agent, or Firm* — Carolyn A. Fischer

(57) ABSTRACT

Compositions and films are described comprising a polylactic (PLA) polymer and a copolymer comprising a first (Continued)

moiety comprising a C12-C30 alkyl group and a second moiety that is miscible in the composition. Suitable first moieties include a C12-C30 alkyl (meth)acrylate or a polyvinyl alcohol comprising pendent C12-C30 alkyl groups. Suitable second moieties include C1-C10 (meth)acrylic acid or ester thereof, vinyl acetate and ethylene vinyl acetate. The aforementioned composition may be used to form a release layer of an adhesive article such as a pressure sensitive adhesive tape. The films may be a monolithic film or a film layer of a multilayer film. The release layer may be disposed upon a substrate layer that may also comprise PLA. The films are produced by melt extrusion of the aforementioned composition and may be oriented.

17 Claims, 3 Drawing Sheets

(51) Int. Cl.
| | | |
|---|---|---|
| *B29C 48/00* | (2019.01) | |
| *B29C 48/08* | (2019.01) | |
| *B29C 48/21* | (2019.01) | |
| *B29C 55/16* | (2006.01) | |
| *B29K 67/00* | (2006.01) | |
| *B32B 7/06* | (2019.01) | |
| *B32B 7/12* | (2006.01) | |
| *B32B 27/08* | (2006.01) | |
| *B32B 27/18* | (2006.01) | |
| *B32B 27/30* | (2006.01) | |
| *B32B 27/32* | (2006.01) | |
| *B32B 27/36* | (2006.01) | |
| *C08L 67/04* | (2006.01) | |
| *C08L 67/06* | (2006.01) | |

(52) U.S. Cl.
CPC .............. *B32B 27/08* (2013.01); *B32B 27/36* (2013.01); *C08L 67/04* (2013.01); *C08L 67/06* (2013.01); *B29C 48/0018* (2019.02); *B29C 48/08* (2019.02); *B29C 48/21* (2019.02); *B29C 55/16* (2013.01); *B29K 2067/046* (2013.01); *B29K 2995/0053* (2013.01); *B32B 27/18* (2013.01); *B32B 27/306* (2013.01); *B32B 27/32* (2013.01); *B32B 2250/02* (2013.01); *B32B 2367/00* (2013.01); *B32B 2405/00* (2013.01); *C08J 2367/04* (2013.01); *C08J 2423/08* (2013.01); *C08J 2429/04* (2013.01); *C08J 2433/06* (2013.01); *Y10T 428/14* (2015.01); *Y10T 428/1452* (2015.01); *Y10T 428/1476* (2015.01); *Y10T 428/31786* (2015.04)

(56) References Cited

U.S. PATENT DOCUMENTS

| | | | |
|---|---|---|---|
| 3,011,988 A | 12/1961 | Luedke | |
| 5,296,277 A | 3/1994 | Wilson | |
| 5,443,780 A | 8/1995 | Matsumoto | |
| 5,623,010 A | 4/1997 | Groves | |
| 5,677,376 A | 10/1997 | Groves | |
| 6,136,905 A | 10/2000 | Suzuki | |
| 6,294,249 B1 | 9/2001 | Hamer | |
| 6,323,308 B1 | 11/2001 | Kobayashi | |
| 6,600,008 B1 | 7/2003 | Kobayashi | |
| 6,649,732 B2 | 11/2003 | Kobayashi | |
| 6,808,795 B2 | 10/2004 | Noda | |
| 6,905,987 B2 | 6/2005 | Noda | |
| 6,919,405 B2 | 7/2005 | Kinning | |
| 7,718,718 B2 | 5/2010 | Kanzawa | |
| 8,158,731 B2 | 4/2012 | Stefanisin | |
| 8,183,322 B2 | 5/2012 | Gerard | |
| 8,450,420 B2 | 5/2013 | Sakurai | |
| 8,512,852 B2 | 8/2013 | Shimizu | |
| 9,096,782 B2 | 8/2015 | Takahira | |
| 9,314,999 B2 | 4/2016 | Cloutier | |
| 11,286,405 B2 * | 3/2022 | Merrill | B32B 3/20 |
| 11,524,489 B2 * | 12/2022 | Iwase | B32B 27/302 |
| 2002/0143116 A1 | 10/2002 | Noda | |
| 2003/0215628 A1 | 11/2003 | Ma | |
| 2004/0054051 A1 | 3/2004 | Ouchi | |
| 2005/0154114 A1 * | 7/2005 | Hale | C08L 67/04 524/436 |
| 2006/0177674 A1 * | 8/2006 | Aritake | B32B 27/08 428/458 |
| 2009/0018268 A1 | 1/2009 | Sakurai | |
| 2009/0076191 A1 * | 3/2009 | Aoyama | C08L 2666/04 523/124 |
| 2009/0152095 A1 | 6/2009 | Kawahara | |
| 2009/0162683 A1 * | 6/2009 | Douard | C08K 5/42 428/480 |
| 2009/0169844 A1 * | 7/2009 | Yamamura | C08L 67/04 428/213 |
| 2010/0093888 A1 * | 4/2010 | Endo | C08K 5/29 523/124 |
| 2010/0184915 A1 | 7/2010 | Miyamoto | |
| 2010/0221560 A1 * | 9/2010 | Knoerzer | B32B 27/08 428/458 |
| 2010/0267867 A1 * | 10/2010 | Cygan | C08L 101/16 524/35 |
| 2011/0076511 A1 * | 3/2011 | Paolilli | B32B 15/09 428/614 |
| 2011/0086998 A1 | 4/2011 | Kusunoki | |
| 2011/0118395 A1 * | 5/2011 | Kiuchi | C08K 3/22 264/319 |
| 2011/0201728 A1 | 8/2011 | Yamamoto | |
| 2011/0287206 A1 * | 11/2011 | Suwa | C08J 5/18 428/41.8 |
| 2011/0316203 A1 | 12/2011 | Emslander | |
| 2012/0035323 A1 * | 2/2012 | Donnelly | C08L 23/10 525/64 |
| 2012/0142823 A1 * | 6/2012 | Cygan | C08L 67/02 524/35 |
| 2012/0196997 A1 * | 8/2012 | Lu | C08F 212/08 526/273 |
| 2012/0288692 A1 | 11/2012 | Broyles | |
| 2013/0068769 A1 | 3/2013 | Sharps | |
| 2013/0123397 A1 * | 5/2013 | Suwa | C08K 5/0083 524/94 |
| 2014/0308482 A1 * | 10/2014 | Masunari | C09J 7/21 428/161 |
| 2015/0017439 A1 * | 1/2015 | Pontarin | C08L 77/02 428/373 |
| 2015/0114551 A1 * | 4/2015 | Moritz | B32B 27/20 428/335 |
| 2015/0329685 A1 | 11/2015 | Suwa | |
| 2016/0326290 A1 * | 11/2016 | Kumar | B05D 1/305 |
| 2020/0109314 A1 * | 4/2020 | Merrill | B32B 7/04 |

FOREIGN PATENT DOCUMENTS

| | | | |
|---|---|---|---|
| EP | 2778205 A | * | 9/2014 |
| GB | 875016 | * | 8/1961 |
| JP | 09236409 | | 9/1997 |
| JP | 2000289169 | | 10/2000 |
| JP | 2003301152 | | 10/2003 |
| JP | 2004-034631 A | * | 2/2004 |
| JP | 2005-036054 | | 2/2005 |
| JP | 2007-099952 A | * | 4/2007 |
| JP | 2007099952 | | 4/2007 |
| JP | 2007-269995 | | 10/2007 |
| JP | 2009-013405 A | * | 1/2009 |
| JP | 2010-189536 A | * | 9/2010 |
| KR | 2014-0033831 A | * | 3/2014 |
| KR | 20140033831 | | 3/2014 |
| WO | WO 1998-15601 | | 4/1998 |
| WO | WO 1998-29516 | | 7/1998 |

(56) References Cited

FOREIGN PATENT DOCUMENTS

| WO | WO 1999-03907 | 1/1999 |
| WO | WO 2000-44841 | 8/2000 |
| WO | WO 2003-057765 | 7/2003 |
| WO | WO 2008/149943 | 12/2008 |
| WO | WO 2009-152349 | 12/2009 |
| WO | WO 2010-077487 | 7/2010 |
| WO | WO 2010-078134 | 7/2010 |
| WO | WO 2010-080567 | 7/2010 |
| WO | WO 2010-088067 | 8/2010 |
| WO | WO 2010-117612 | 10/2010 |
| WO | WO 2011-075619 | 6/2011 |
| WO | WO 2011-082052 | 7/2011 |
| WO | WO 2011-084670 | 7/2011 |
| WO | WO 2015-142779 | 9/2015 |
| WO | WO 2015-199957 | 12/2015 |
| WO | WO 2016-105998 | 6/2016 |
| WO | WO 2017-105887 | 6/2017 |
| WO | WO 2017-200756 | 11/2017 |
| WO | WO 2018-106523 | 6/2018 |

OTHER PUBLICATIONS

Lim, "Processing Technologies For Poly(lactic acid)", Progress in Polymer Science, 2008, vol. 33, pp. 820-852.
Tsuji, "Isothermal And Non-Isothermal Crystallization Behavior of Poly(L-lactic acid): Effects of Stereocomplex As Nucleating Agent", Polymer, 2006, vol. 47, No. 15, p. 5430.
International Search Report for PCT International Application No. PCT/US2017/063557, mailed on Mar. 1, 2018, 6 pages.

\* cited by examiner

COMPOSITION AND FILMS COMPRISING POLYLACTIC ACID POLYMER AND COPOLYMER COMPRISING LONG CHAIN ALKYL MOIETY

CROSS REFERENCE TO RELATED APPLICATIONS

This application is a national stage filing under 35 U.S.C. 371 of PCT/US2017/063557, filed Nov. 29, 2017, which claims the benefit of U.S. Provisional Application No. 62/430,012, filed Dec. 5, 2016, the disclosure of which is incorporated by reference in its/their entirety herein.

SUMMARY

Presently described are compositions and films comprising a polylactic acid (PLA) polymer. The composition further comprises a copolymer comprising a long chain alkyl moiety. The copolymer further comprises a second moiety that is miscible in the polylactic acid polymer. In favored embodiments, the composition comprising the polylactic acid polymer and copolymer may be used to form a release layer of an adhesive article such as a pressure sensitive adhesive tape. The films may be a monolithic film or a film layer of a multilayer film. The release layer may be disposed upon a substrate layer. The substrate layer may also comprise polylactic acid polymer. The substrate layer may be coextruded with the release layer. In some favored embodiments, the film or film layer is oriented.

The figures are intended to be merely illustrative, are not to scale, and are not limiting of the invention.

DETAILED DESCRIPTION

Figure 1:
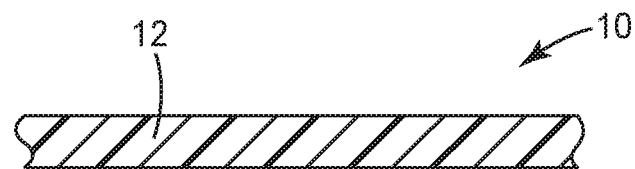
FIG. 1 is a cross-sectional view of one embodiment of a release article.

Referring now to FIG. 1, an embodiment of a release article of the present invention is shown. Release film 10 comprises a single (e.g. extruded) release layer 12 comprising a release composition of the present invention.

Figure 2:
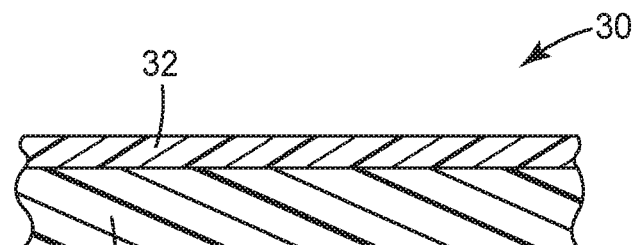
FIG. 2 is a cross-sectional view of one embodiment of a release article.

In another embodiment as shown in FIG. 2, release article 30 includes release layer 32 and substrate 34. Release layer 32 comprises a release composition of the present invention. Substrate 34 is preferably a thermoplastic polymer that is co-extruded with release layer 32. Alternatively, release layer 32 may be coated (e.g., hot-melt or solvent) or extruded onto preexisting substrate 34 to provide release film 30. In some favored embodiments, substrate 34 is a PLA-based film or other bio-based (e.g. film) material.

Release compositions of the present invention may be used as release layers in adhesive articles, for example, pressure sensitive adhesive tapes. When used in pressure sensitive adhesive tapes, release layers of the present invention may be referred to as low adhesion backsize layers or LABs.

Figure 3:
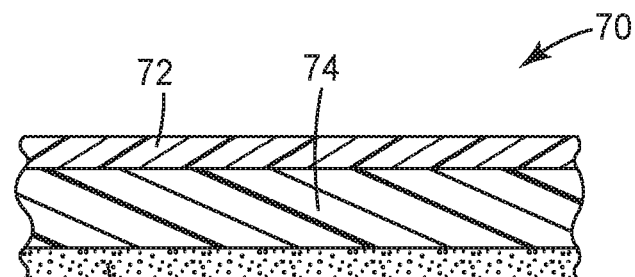
FIG. 3 is a cross-sectional view of one embodiment of an adhesive article.

FIG. 3 shows one embodiment of a pressure sensitive adhesive tape 70 including release layer 72 disposed on or approximate one surface of substrate 74 and adhesive layer 76 situated on the opposite surface of substrate 74. The pressure sensitive adhesive tape may be formed by co-extruding release layer 72 with substrate 74, followed by coating adhesive layer 76 on the other side of substrate 74 in a separate coating operation. Adhesive layer 76 may be coated, for example, by a hot-melt or solvent coating process. Alternatively, release layer 72 may be coated onto pre-existing substrate 74 in a first coating operation followed by application of adhesive layer 76 in a second coating operation. Further alternatively, release layer 72 along with substrate 74 and adhesive layer 76 may be simultaneously co-extruded to provide pressure sensitive adhesive tape 70.

Multi-layered films may be co-extruded to provide useful backings for pressure sensitive adhesive tapes, for example, duct tapes, packaging tapes, medical tapes and the like.

Single (see, e.g., FIG. 1) and multi-layered release articles (see, e.g., FIG. 2) and adhesive articles (see, e.g., FIG. 3) may be prepared, for example, using blown-film, cast-film or other extrusion techniques known to those of skill in the art. Typically, a minor amount of a polymeric release material is dry or melt blended and extruded with a major amount of PLA-based polymer. In some embodiments, the extruded article is hot-stretched in a known manner to provide a uniaxially oriented film in the machine-direction or transverse direction (TDO). In other embodiments, the extruded film is biaxially oriented, for example, by machine-direction orientation along with cross-direction orientation. The stretching may be performed in a sequential or simultaneous manner. Stretching of the extruded film may improve the release properties as well as other properties (e.g. reduced noise) as will subsequently be described of the extruded film and may allow a greater area of film to be produced from a given quantity of material.

The thickness of the substrate or core film layer is typically at least 10, 15, 20, or 25 microns (1 mil) and typically no greater than 500 microns (20 mil) thickness. In some embodiments, the thickness of the substrate or core film layer is no greater than 400, 300, 200, or 100 microns. The release layer and adhesive layer may have the same thickness as the substrate or core film layer. However, the release layer and/or the adhesive layer may have a thickness of less than 10 microns. In some embodiments, the release layer and/or the adhesive is typically at least 250 nm, 500 nm, 750 nm or 1 micron.

Components making up the release compositions, release articles and adhesive articles of the present invention are more fully described below.

The release composition and films described herein comprise a polylactic acid polymer. Unless specified otherwise, the (e.g. film) composition subsequently described refers to the release composition, or film thereof as well as the PLA-based film substrate the release composition may be disposed upon.

Lactic acid is a renewable material obtained by the bacterial fermentation of corn starch or cane sugar, and thus is considered a natural or in other words "biomass" material. Lactic acid has two optical isomers: L-lactic acid (also known as (S)-lactic acid) and D-lactic acid (also known as (R)-lactic acid), depicted as follows:

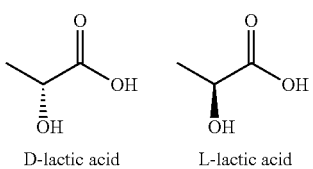

D-lactic acid     L-lactic acid

Polyesterification of lactic acid affords polylactic acid (PLA) polymer.

More typically, lactic acid is typically converted to the cyclic lactide monomer, and the lactide undergoes ring opening polymerization, such as depicted as follows:

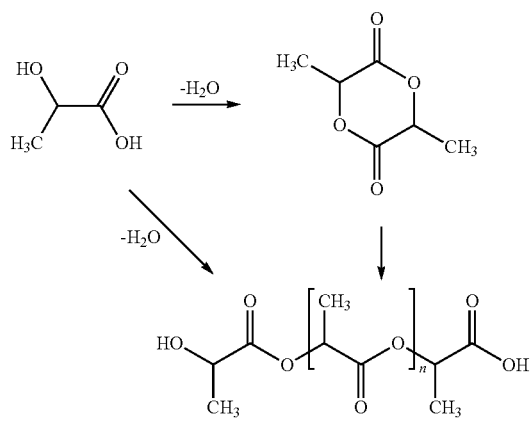

The resulting polymer material is typically referred to as polylactide polymer or poly(lactic acid) polymer.

The degree of crystallinity, and hence many important properties, is largely controlled by the ratio of D and/or meso-lactide to L cyclic lactide monomer used. Likewise, for polymers prepared by direct polyesterification of lactic acid, the degree of crystallinity is largely controlled by the ratio of polymerized units derived from D-lactic acid to polymerized units derived from L-lactic acid.

The (e.g. film) composition described herein generally comprises at least one semicrystalline PLA polymer alone or in combination with at least one amorphous PLA polymer. The term "semicrystalline PLA" refers to a PLA polymer having the ability to develop crystallinity. Both the semicrystalline and amorphous PLA polymers generally comprise high concentrations of polymerized units derived from L-lactic acid (e.g. L-lactide) with low concentrations of polymerized units derived from D-lactic acid (e.g. D-lactide).

The semicrystalline PLA polymer typically comprises at least 90, 91, 92, 93, 94, or 95 wt.-% of polymerized units derived from L-lactic acid (e.g. L-lactide) and no greater than 10, 9, 8, 7, 6, or 5 wt.-% of polymerized units derived from D-lactic acid (e.g. D-lactide and/or meso-lactide). In yet other embodiments, the semicrystalline PLA polymer comprises at least 96 wt.-% of polymerized units derived from L-lactic acid (e.g. L-lactide) and less than 4, 3, or 2 wt.-% of polymerized units derived from D-lactic acid (e.g. D-lactide and/or meso-lactide). Likewise the film comprises an even lower concentration of polymerized units derived from D-lactic acid (e.g. D-lactide and/or meso-lactide) depending on the concentration of semicrystalline PLA polymer in the (e.g. film) composition. For example, if the (e.g. film) composition comprises 50 wt.-% of a semicrystalline PLA having about 2 wt.-% D-lactide and/or meso-lactide, the (e.g. film) composition comprises about 1 wt.-% D-lactide and/or meso-lactide. The (e.g. film) composition generally comprises no greater than 9, 8, 7, 6, 5, 4, 3, 2, 1.5, 1.0, 0.5, 0.4, 0.3, 0.2, or 0.1 wt.-% polymerized units derived from D-lactic acid (e.g. D-lactide and/or meso-lactide). Suitable examples of semicrystalline PLA include Natureworks™ Ingeo™ 4042 D and 4032D. These polymers have been described in the literature as having molecular weight (Mw) of about 200,000 g/mole; Mn of about 100,000 g/mole; and a polydispersity of about 2.0.

Alternatively, the semicrystalline PLA polymer may comprise at least 90, 91, 92, 93, 94, or 95 wt.-% of polymerized units derived from D-lactic acid (e.g. D-lactide) and no greater than 10, 9, 8, 7, 6, or 5 wt.-% of polymerized units derived from L-lactic acid (e.g. L-lactide and/or meso-lactide). In yet other embodiments, the semicrystalline PLA polymer comprises at least 96 wt.-% of polymerized units derived from D-lactic acid (e.g. D-lactide) and less than 4, 3, or 2 wt.-% of polymerized units derived from L-lactic acid (e.g. L-lactide and/or meso-lactide). Likewise the (e.g. film) composition comprises an even lower concentration of polymerized units derived from L-lactic acid (e.g. L-lactide and/or meso-lactide) depending on the concentration of semicrystalline PLA polymer. For example, if the (e.g. film) composition comprises 50 wt.-% of a semicrystalline PLA having about 2 wt.-% L-lactide and/or meso-lactide, the (e.g. film) composition comprises about 1 wt.-% L-lactide and/or meso-lactide. The (e.g. film) composition generally comprises no greater than 9, 8, 7, 6, 5, 4, 3, 2, 1.5, 1.0, 0.5, 0.4, 0.3, 0.2, or 0.1 wt.-% polymerized units derived from L-lactic acid (e.g. L-lactide and/or meso-lactide). Examples of such semicrystalline PLA are available as "Synterra™ PDLA".

The amorphous PLA typically comprises no more than 90 wt.-% of polymerized units derived from L-lactic acid and greater than 10 wt.-% of polymerized units derived from D-lactic acid (e.g. D-lactide and/or meso-lactide). In some embodiments, the amorphous PLA comprises at least 80 or 85 wt.-% of polymerized units derived from L-lactic acid (e.g. L-lactide). In some embodiments, the amorphous PLA comprises no greater than 20 or 15 wt.-%. of polymerized units derived from D-lactic acid (e.g. D-lactide and/or meso-lactide). A suitable amorphous PLA includes Natureworks™ Ingeo™ 4060 D grade. This polymer has been described in the literature to have a molecular weight Mw of about 180,000 g/mole.

Alternatively, the amorphous PLA typically comprises no more than 90 wt.-% of polymerized units derived from D-lactic acid and greater than 10 wt.-% of polymerized units derived from L lactic acid (e.g. L-lactic lactide and/or meso-lactide). In some embodiments, the amorphous PLA comprises at least 80 or 85 wt.-% of polymerized units derived from D-lactic acid (e.g. D-lactide). In some embodiments, the amorphous PLA comprises no greater than 20 or 15 wt.-%. of polymerized units derived from L-lactic acid (e.g. L-lactide and/or meso-lactide).

The PLA polymers are typically considered homopolymers. However, the PLA polymer may optionally comprise relatively low concentrations of repeat units derived from other comonomers. The total concentration of repeats derived from other comonomers of the PLA polymer is typically no greater than 10, 9, 8, 7, 6, or 5 wt.-%. In some embodiments, the concentration of repeats derived from other comonomers of the PLA polymer is typically no greater than 4, 3, 2, 1 or 0.5 wt.-%.

The PLA polymers are preferably "film grade" polymers, having a melt flow rate (as measured according to ASTM D1238) of no greater than 25, 20, 15, or 10 g/min at 210° C. with a mass of 2.16 kg. In some embodiments, the PLA polymer has a melt flow rate of less than 10 or 9 g/min at 210° C. The melt flow rate is related to the molecular weight of the PLA polymer. The PLA polymer typically has a weight average molecular weight (Mw) as determined by Gel Permeation Chromatography with polystyrene standards of at least 50,000 g/mol; 75,000 g/mol; 100,000 g/mol; 125,000 g/mol; 150,000 g/mol. In some embodiments, the molecular weight (Mw) is no greater than 400,000 g/mol; 350,000 g/mol or 300,000 g/mol.

The PLA polymers typically have a tensile strength ranging from about 25 to 150 MPa; a tensile modulus ranging from about 1000 to 7500 MPa; and a tensile elongation of at least 3, 4, or 5 ranging up to about 10 or 15%. In some embodiments, the tensile strength at break of the PLA polymer is at least 30, 35, 40, 45, or 50 MPa. In some embodiments, the tensile strength of the PLA polymer is no greater than 125, 100, or 75 MPa. In some embodiments, the tensile modulus of the PLA polymer is at least 1500, 2000, 2500, or 3000 MPa. In some embodiments, the tensile modulus of the PLA polymer is no greater than 7000, 6500, 6000, 5500, 5000, or 4000 MPa. Such tensile and elongation properties can be determined by ASTM D882 and are typically reported by the manufacturer or supplier of such PLA polymers.

The PLA polymers generally have a glass transition temperature (Tg) midpoint (half-height) as determined by Differential Scanning calorimetry (DSC), according to the test method described in the examples, ranging from about 50 to 65° C. In some embodiments, the Tg midpoint (half-height) is at least 51, 52, 53, 54, or 55° C.

The semicrystalline PLA polymers typically have a (e.g. peak maximum) melting point ranging from 140 to 175° C., 180° C., 185° C. or 190° C. In some embodiments, the (e.g. peak maximum) melting point is at least 145, 150, or 155° C. The PLA polymer composition can be melt-processed at temperatures of 180, 190, 200, 210, 220 or 230° C.

In one embodiment, PLA polymers can crystallize to form a stereocomplex (*Macromolecules*, 1987, 20 (4), pp 904-906). The PLA stereocomplex is formed when PLLA (a PLA homopolymer polymerized from mostly L-lactic acid or L-lactide units) is blended with PDLA (a PLA homopolymer polymerized from mostly D-lactic acid or D-lactide units). The stereocomplex crystal of PLA is of interest because the melting temperature of this crystal ranges from 210-250° C. The higher melting temperature stereocomplex PLA crystals increase the thermal stability of the PLA-based material. The PLA stereocomplex crystal is also know to effectively nucleate PLA homopolymer crystallization (*Polymer, Volume* 47*, Issue* 15, 12 Jul. 2006, Page 5430). This nucleation effect increases the overall percent crystallinity of the PLA-based material, thus increasing the material's thermal stability.

In some embodiments, the (e.g. film) composition described herein comprise PLA polymer in an amount of at least 50, 55 or 60 wt.-%, based on the total weight of the organic components of the (e.g. film) composition. The total amount of PLA polymer is typically less than 99, 98, 97, 96, or 95 wt.-%. of the (e.g. film) composition.

The PLA polymer is typically a semicrystalline PLA polymer or a blend of semicrystalline PLA polymer and other polymers. When the PLA polymer comprises a blend of at least one semicrystalline and at least one amorphous PLA, the amount of semicrystalline PLA is typically at least 50, 55 or 60 wt.-%, based on the total weight of the organic component of the composition. In some embodiments, the amount of amorphous PLA polymer ranges from 5, 10, or 15 wt.-% up to 30, 35 or 40 wt.-% based on the total weight of the organic components of the composition.

The (e.g. film) composition and especially the PLA-based film substrate may optionally further comprise at least one second polymer, such as polyvinyl acetate polymer. Without intending to be bound by theory, the second polymer is believed to be miscible with the PLA polymer, the plasticizer, or the combination thereof. The inclusion of the second (e.g. polyvinyl acetate) polymer can improve the compatibility of the PLA with a plasticizer such that the plasticizer concentration can be increased without plasticizer migration (as described in WO 2016/105998). The inclusion of the second polymer (e.g. polyvinyl acetate) in combination with the plasticizer can also reduce the haze and reduce the shrinkage of the resulting (e.g. uniaxially or biaxially) oriented film. The inclusion of the second polymer (e.g. polyvinyl acetate) in combination with the plasticizer can also reduce the dielectric loss tangent of the resulting (e.g. biaxially) oriented film. Many PLA-based films have been described as being "noisy." A film with a lower dielectric loss tangent is less noisy, or in other words a quieter film when flexed or handled.

The second (e.g. polyvinyl acetate) polymer may have a midpoint (half-height) Tg determined by Differential Scanning calorimetry (DSC) according to the test method described in the examples of greater than 0, 5 or 10° C. and more typically a Tg of at least 15, 20, 25, 30, 35 or 40° C. The midpoint (half-height) Tg of the second (e.g. polyvinyl acetate) polymer is typically no greater than 80, 75, 70, 65, 60, 55, 50 or 45° C.

The second (e.g. polyvinyl acetate) polymer may have a weight average molecular weight (measured using Gel Permeation Chromatography (GPC), as calibrated using polystyrene (PS) standards) of greater than 25,000 g/mole, 30,000 g/mole, 35,000 g/mole, 40,000 g/mole, or 45,000 g/mole. In some embodiments, the molecular weight of the second (e.g. polyvinyl acetate) polymer is at least 50,000 g/mole, 55,000 g/mole, or 60,000 g/mole. PLA-based films comprising polyvinyl acetate polymer having a molecular weight of 15,000 or 25,000 g/mole can become tacky over time and have a tendency to block. This tendency may be overcome by the addition of antiblocking agent. However, the inclusion of antiblocking agents can increase the haze. In the case of the release composition and film thereof, this tendency may also be overcome by the addition of the copolymer release agent.

In some embodiments, the weight average molecular weight of the second (e.g. polyvinyl acetate) polymer is at least 75,000 g/mol; 100,000 g/mol; 125,000 g/mol; 150,000 g/mol. In other embodiments, the molecular weight of the second (e.g. polyvinyl acetate) polymer is at least 175,000 g/mol; 200,000 g/mol; 225,000 g/mol or 250,000 g/mol. In some embodiments, molecular weight of the second (e.g. polyvinyl acetate) polymer is no greater than 2,000,000 g/mol, 1,500,000 g/mol, 1,000,000 g/mol, or 500,000 g/mol. When the molecular weight is not too high, the second (e.g. polyvinyl acetate) polymer can aid in reducing the melt processing temperature and thereby reduce degradation of the PLA polymer.

In some embodiments, the second polymer when present is preferably a polyvinyl acetate polymer. The polyvinyl acetate polymer is typically a homopolymer. However, the polymer may comprise relatively low concentrations of repeat units derived from other comonomers, provided that the Tg of the polyvinyl acetate polymer is within the ranges previously described. Other comonomers include for example acrylic monomers such as acrylic acid and methyl acrylate; vinyl monomers such as vinyl chloride and vinyl pyrollidone; and $C_2$-$C_8$ alkylene monomers, such as ethylene. The total concentration of repeats derived from other comonomers of the polyvinyl acetate polymer is typically no greater than 10, 9, 8, 7, 6, or 5 wt.-%. In some embodiments, the concentration of repeats derived from other comonomers of the polyvinyl acetate polymer is typically no greater than 4, 3, 2, 1 or 0.5 wt.-%. The polyvinyl acetate polymer typically has a low level of hydrolysis. The polymerized units of the polyvinyl acetate polymer that are hydrolyzed to units of vinyl alcohol is generally no greater than 10, 9, 8, 7, 6, 5, 4, 3, 2, 1 or 0.5 mol % of the polyvinyl acetate polymer.

Polyvinyl acetate polymers are commercially available from various suppliers including Wacker, Chemie AG, Muenchen, Germany, under the trade designation VINNAPAS™ and from Americas Corporation, West Chicago, IL, under the trade designation VINAVIL™. Prior to combining with the PLA, such polyvinyl acetate polymers are often in a (e.g. white) solid powder or colorless bead form. In some embodiments, the polyvinyl acetate polymer (e.g. powder, prior to combining with the PLA polymer) is not water redispersible.

A single second (e.g. polyvinyl acetate) polymer may be utilized or a combination of two or more second (e.g. polyvinyl acetate) polymers may be used.

When present, the total amount of second (e.g. polyvinyl acetate) polymer present in the (e.g. film) composition and especially the PLA-based film substrate is at least about 1, 2, 3, 4, 5 wt.-% and typically no greater than about 50, 45, or 40 wt.-% based on the total weight of the PLA polymer, second (e.g. polyvinyl acetate) polymer, and plasticizer. In some embodiments, the total amount of second (e.g. polyvinyl acetate) polymer present in the oriented film is least 6, 7, 8, 9, or 10 wt.-%. In some embodiments, the concentration of second (e.g. polyvinyl acetate) polymer is no greater than 35, 30, 25 or 20 wt.-%.

The (e.g. release) composition and films thereof described herein comprise a copolymer that functions as a release agent. The copolymer comprises at least a first long chain alkyl moiety and a second moiety that is miscible in the PLA polymer composition. The copolymer optionally further comprising other moieties that do not detract from the desired release properties.

The amount of (e.g. copolymer) release agent in the PLA release composition and film is typically at least 1, 2, 3, or 4 wt.-% of the total PLA release composition and film. The amount of (e.g. copolymer) release agent in the PLA release composition and film is typically no greater than 25 wt.-% and in some embodiments, no greater than 20, 19, 18, 17, 16, 15, 14, 13, 12, or 10 wt.-% of the PLA release composition and film.

The copolymer release agent has sufficient polymerized units of such that the copolymer has a (e.g. number average) molecular weight of at least 5,000; 10,000; 15,000, 20,000; 25,000; 30,000; 35,000; 40,000; 45,000 or 50,000 grams/mole. The (e.g. number average) molecular weight can range up about 300,000 grams/mole. In some embodiments, the (e.g. number average) molecular weight is no greater than 250,000; 200,000; 150,000; or 100,000 grams/mole. The molecular weight can be determined by dissolving the copolymer is THF (tetrahydrofuran) and utilizing size exclusion chromatography using polystyrene standard.

Representative examples of polymeric release materials include polyvinyl N-alkyl carbamates, polyvinyl N-alkyl carbamides, poly alkyl(meth)acrylate copolymers, and the like. Such copolymers generally comprise little or no silicone or fluorinated moieties. Thus, the amount of silicon atoms in the copolymer as well as the release composition is less than 5, 4, 3, 2, 1, 0.5, 0.1, 0.01, or 0.001 wt.-%. Further, the amount of fluorine atoms in the copolymer as well as the release composition is less than 5, 4, 3, 2, 1, 0.5, 0.1, 0.01, or 0.001 wt.-%. It is appreciated that a detectable amount of silicon or fluorine atom may be present as an unintended contaminant.

The release agent may be represented by general formula (I):

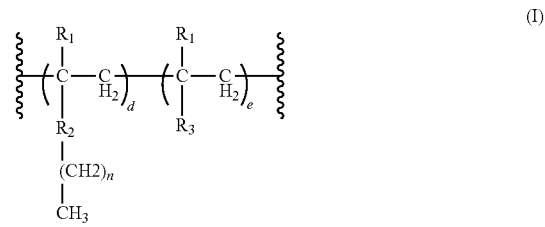

wherein $R_1$ is, independently, H or $CH_3$;
$R_2$ is C(O)CO;
$R_3$ is independently H; C1-C10 alkyl; OH; —OC(O)—$CH_3$; or —C(O)O—$R_4$, wherein $R_4$ is independently, H or C1-C4 alkyl;
n ranges from 12 to 30; and
d and e are selected to provide the desired release characteristics and sufficient solubility properties, with the proviso that d is not 0.

For embodiments, wherein $R_3$ is alkyl, the alkyl group is non-crystalline at 25° C. Representative examples of non-crystalline alkyl groups include C1-C10 alkyl groups. The shorter alkyl groups, such as C1-C8 may be linear. The longer alkyl groups are branched or cyclic. For example isobornyl is generally non-crystalline at 25° C.

In some embodiments, n is independently no greater than 24, 23, 22, or 21.

In some embodiments, the (e.g. release agent) copolymer is derived from more than one monomer comprising the long chain alkyl moiety. In this embodiment, d1 may represent polymerized unit comprising a first long chain alkyl moiety and d2 may represent polymerized unit comprising a second long chain alkyl moiety. In this embodiment, d is the sum of d1 and d2.

In some embodiments, d and e are chosen such that the amount of polymerized unit comprising the long chain alkyl moiety (i.e. d) are present in the copolymer in an amount of at least 25, 30, 35, 40, 45, 55, or 60 wt.-% of the (e.g. release agent) copolymer. In some embodiments, the amount of polymerized unit comprising the long chain alkyl moiety (i.e. d) are present in an amount no greater than 95, 90, 85, 80, 75, 70 wt.-% of the (e.g. release agent) copolymer.

In some embodiments, amount of polymerized units comprising a moiety that is miscible with the PLA polymer (i.e. e) are present in the copolymer is an amount of at least 5, 10, 15, 20, 25, 30, wt.-% of the (e.g. release agent) copolymer. In some embodiments, the amount of polymerized units comprising a moiety that is miscible with the PLA polymer (i.e. e) are present in an amount no greater than 75, 70, 65, 60, 55, or 40 wt.-% of the (e.g. release agent) copolymer.

In still other embodiments, the moiety that is miscible with PLA polymer (i.e. e) is present in very small amounts, e.g. less than 5, 2 or 1 wt.-%. Several factors may affect the desired level of this miscible moiety. Clarity and cosmetic appearance of the final film may sometimes be improved by increasing the level of this miscible moiety. Anchoring of the release material to the underlying film can also sometimes be improved by increasing the level of this miscible moiety. On the other hand, the accumulation of an appropriate amount of the release material on the desired surface to achieve the desired level of release performance during extrusion, film formation and/or subsequent film processing may sometimes be improved by decreasing the level of this miscible moiety. Thus, optimization of the level of this miscible moiety is the result of the balancing of the desired properties of the film within the constraints of the given processes used to make the film.

In some embodiments, the polymerized unit comprising the long chain alkyl moiety are typically an acrylic acid ester of a long chain alkyl terminated primary alcohol. Fatty alcohols typically have the general formula R—OH wherein R is a (e.g. straight or branched chain) alkyl, optionally substituted in available positions by N, O, or S atoms. Various fatty alcohols are known including dodecyl alcohol, cetyl alcohol $CH_3(CH_2)_{15}OH$, stearyl alcohol (also known as octadecyl alcohol or 1-octadecanol), and oleyl alcohol.

In some embodiments, the second moiety is derived from an acidic monomer and the copolymer may be characterized as a poly alkyl(meth)acrylate copolymer release material. For example, a polyalkylacrylate release agent may be prepared by the free-radical copolymerization of octadecyl acrylate with acrylic acid. Acidic monomers include, for example, acrylic acid and methacrylic acid. The acrylic acid present in the release material provides acid functionality for compatibilization with the PLA polymer.

Other monomers may also be included in poly alkyl (meth)acrylate release agent, for example, methylacrylate and methyl methacrylate. Poly alkyl(meth)acrylate release agent are described, for example, in U.S. Pat. No. 2,607,711 (Hendriks) and U.S. Pat. No. 3,011,988 (Luedke et al.), the disclosures of which are incorporated herein by reference.

In some embodiments, the poly alkyl(meth)acrylate release agent has a (e.g. number average) molecular weight of at least 5,000; 10,000; 15,000, 20,000 grams/mole. In some embodiments, the poly alkyl(meth)acrylate release agent has a (e.g. number average) molecular weight no greater than 150,000; 125,000; 100,000; or 75,000 grams/mole.

When the copolymer is a (e.g. random) copolymer of octadecyl acrylate and methyl methacrylate, the amount of the polymerized units of octadecyl acrylate is typically greater than 40 wt.-% of the copolymer release agent. In some embodiments, the amount of the polymerized units of octadecyl acrylate is at least 45, 46, 47, 48, 49, 50, 51, 52, 53, 54, 55, 56, 57, 58, 59, or 60 wt.-% of the copolymer release agent.

In another embodiment, the copolymer release agent is a polyvinyl N-alkyl carbamates or polyvinyl N-alkyl carbamides.

Polyvinyl N-alkyl carbamates and polyvinyl alkyl carbamides are random copolymers that may be represented by the following formula (II):

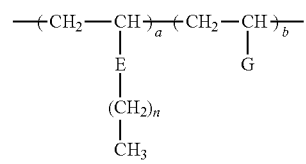

wherein n ranges from 12 to 30;
a and b are selected to provide the desired release characteristics and sufficient solubility properties, with the proviso that a is not 0;
E is, independently,

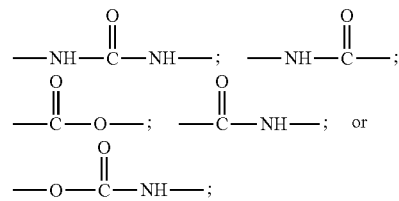

and G is independently $R_3$, as previously described.

In some embodiments, n is independently no greater than 24, 23, 22, or 21.

In some embodiments, the (e.g. release agent) copolymer is derived from more than one monomer comprising the long chain alkyl moiety. In this embodiments, a1 may represent polymerized unit comprising a first long chain alkyl moiety and a2 may represent polymerized unit comprising a second long chain alkyl moiety. In this embodiment, a is the sum of a1 and a2.

Polyvinyl N-alkyl carbamates are described, for example, in U.S. Pat. No. 2,532,011 (Dalquist et al.), the disclosure of which is incorporated herein by reference.

The copolymer release material can be synthesized or purchased as a commercially available material. Representative examples of polyvinyl N-alkyl carbamates include polyvinyl octadecyl carbamate, which is commercially available under the trade designations "ESCOAT P20" and "MAYZO 95H" available from Mayzo Inc. (Norcross, Ga.).

Other suitable copolymer release agents are long-chain pendant polymers, such as commercially available from Lion Specialty Chemicals Co., LTD., Tokyo, Japan under the trade designations "PEELOIL 1010" or "PEELOIL 1010S" or "PEELOIL 2020". Such release agents are also described in the literature as being an ethylene-vinyl acetate-vinyl alcohol copolymer addition compound with octadecyl isocyanate. In some embodiments, such materials comprise polymerized units of vinyl alcohol in an amount of at least 50, 55, 60, 65, 70, 75, 80, 85 or 90 mol-%. In some embodiments, the amount of polymerized units of vinyl alcohol reacted with octadecyl isocyanate is no greater than 85 mole %. In some embodiments, such materials comprise at least 1, 2, or 3 wt.-% of polymerized units of ethylene and typically no greater than 5, 6, 7, 8, 9, or 10 wt.-% of polymerized units of ethylene. In some embodiments, such materials comprise polymerized units of vinyl acetate in an amount no greater than 5, 4, 3, 2, 1 or less than 1 mol-%. In other embodiments, such materials comprise at least 20, 25, 30, 35, 40, or 45 mol-% and typically no greater than 50 mol-% of polymerized units of ethylene.

The release agent copolymer comprises moieties that are miscible with the PLA polymer. Miscibility is the property of substances to mix (fully dissolve) forming a homogeneous composition. That is, a miscible (or in other words soluble) polymer blend or a partially miscible polymer blend can form. The term "miscible" or refers to a monophase system blend where the components are in a uniformly compatibilized state. The phrase "partially miscible" refers to a partially miscible and phase separated polymer blend where the components are in a phase separated state but at least partially compatibilized. Since the long chain alkyl group tend to phase separate to some extent, the release agent copolymer (as a whole) is typically partially miscible with the PLA polymer composition.

Whether a PLA polymer composition containing a release agent copolymer is a miscible system blend or a partially miscible polymer blend can be determined by any suitable technique as known in the art. In one embodiment, the miscibility or solubility measuring the glass transition point (Tg) of the PLA release composition. The Tg can be measured using a differential scanning calorimeter (referred to herein as "DSC"). If the Tg is observed at a single point, the components of the PLA-containing resin composition are in a compatibilized state. If the Tg is observed at two points, the components of the PLA polymer composition are in a phase separated state.

Partially miscible blends can have a phase separated state that can be described as having a co-continuous structure or an island and sea structure. More specifically, in a partially miscible blend, the PLA and release agent copolymer can sometimes form a continuous structure in combination, or the blend may have a structure in which fine particles (islands) of the release agent copolymer are almost uniformly dispersed in the matrix (sea) of the PLA. These components are at least partially miscible, and therefore a miscible segment can assist in compatibilizing an immiscible (e.g. long chain alkyl group) segment in the blend.

In partially miscible blends of PLA polymer composition, the Tg of the PLA-rich phase can be shifted by several degrees Celcius from the original Tg of the pure component. Such shifts show that the release agent copolymer is partially compatibilized with the PLA-rich phase. The degree of the Tg shift can usually be about 3° C. or more, about 3.5° C. or more, or about 4° C. In other words, when the PLA polymer composition is in a "partially compatibilized" state, the composition will have two Tg values, one derived from the PLA and one derived from the release agent copolymer, but at least one of these Tg values will be shifted towards the other Tg value.

Figure 4:
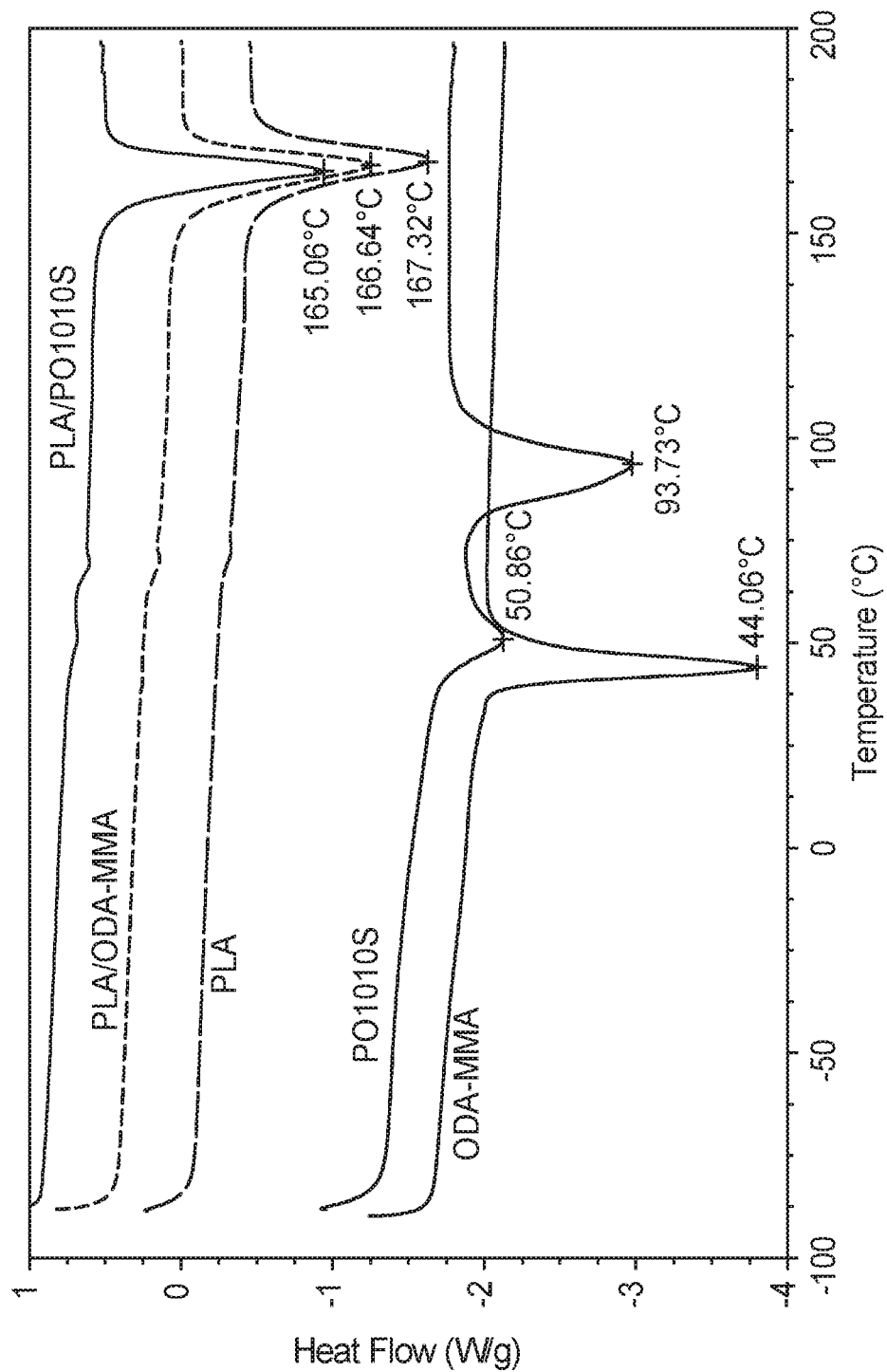
FIGS. 4-5 are Differential Scanning calorimetry curves of a polylactic acid polymer, release agents, and embodied release compositions.

FIG. 4 depicts Differential Scanning calorimetry (DSC) graphs of a two different release agents, oriented films comprising release compositions as described herein (i.e. 2-layer films F11 and F9 of the examples), and a film comprising PLA polymer (i.e. oriented in the same manner as F11). A TA Q2000 Analytical Instrument No. 1129, as can be obtained from TS Instruments LLC, New Castle, DE, was utilized to conduct the DSC testing. The samples were cooled down to −90° C. and then ramped at 20° C. per minute to 200° C. The graphs depicted in FIGS. 4-5 were generated from the first heating cycle.

With reference to FIG. 4, the oriented PLA polymer film alone, lacking any release agent, exhibited a Tg at half height at 68° C. and a major transition at 167° C. due to melting. One illustrative release agent (commercially available from Lion Specialty Chemicals Co., LTD., Tokyo, Japan under the trade designations "PEELOIL 1010S"), depicted two major transitions, at 51° C. and 94° C. It is surmised that the transition at 51° C. corresponds to the melting of the long chain (octadecyl) moieties, whereas the transition at 94° C. corresponds to the melting of the ethylene-vinyl acetate-vinyl alcohol copolymer units. When the oriented PLA film contained about 3 wt.-% of such release agent, the major transition at 94° C. is not evident and the PLA transition at 167° C. shifted to a slightly lower temperature 165° C. presumed to indicate miscibility of the ethylene-vinyl acetate-vinyl alcohol copolymer units with the PLA polymer.

Figure 5:
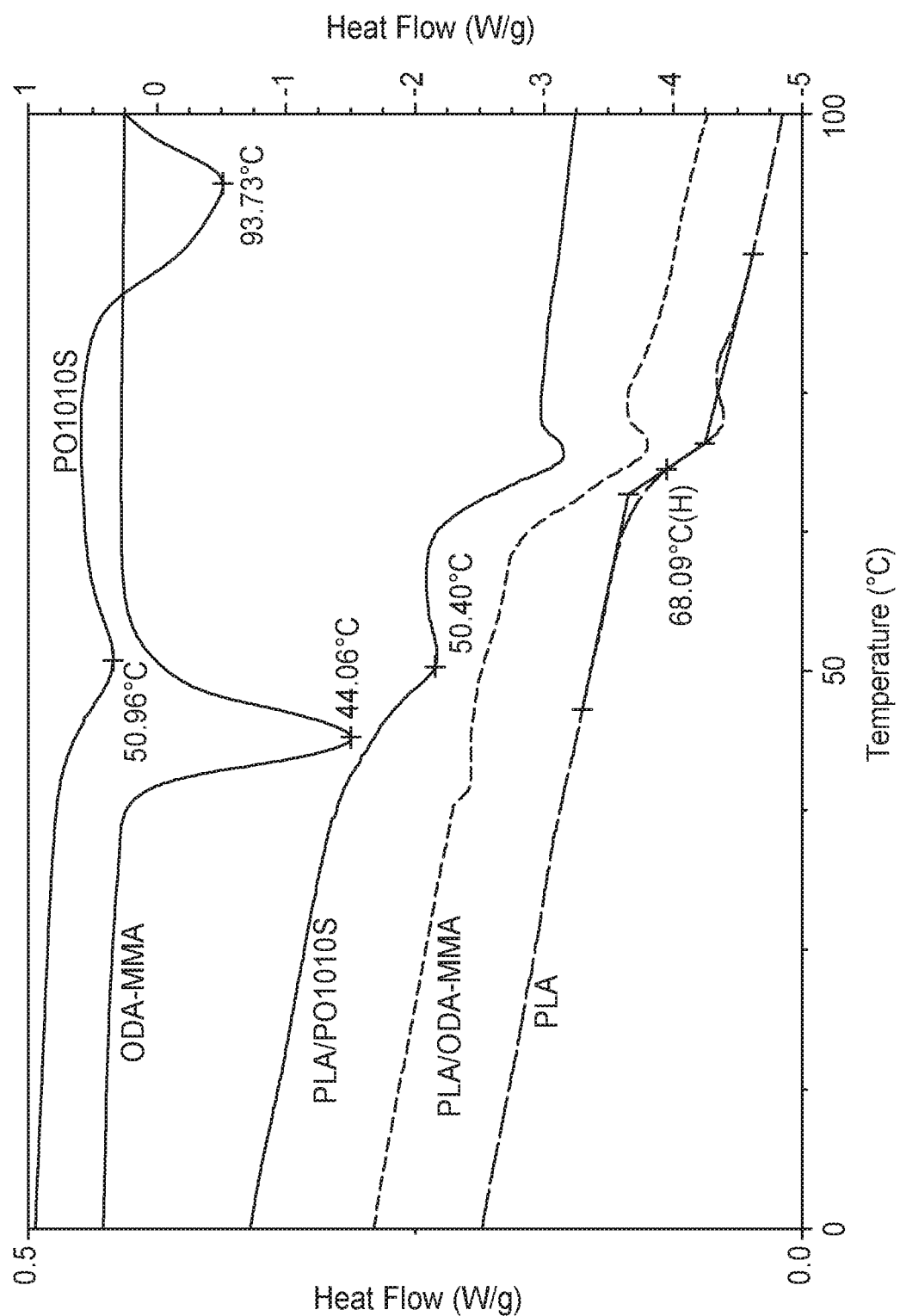

Smaller transitions can be seen in the expanded DSC curve of FIG. 5. With reference to FIG. 5, the oriented PLA film that contained about 3 wt.-% of the "PEELOIL 1010S" release agent exhibited a very small transition around 51° C. This transition may indicate phase separation of the release agent material and migration thereof to the air interface. Surface analysis by XPS (x-ray photoelectron spectroscopy) confirms such phase separation indicating the presence of a carbon rich surface indicative of a long chain (octadecyl) alkyl.

Another illustrative release agent is a 62/38 octadecyl/methyl methacrylate (ODA-MMA) copolymer, as prepared as described in the forthcoming examples. With reference to FIG. 4, this release agent depicted a single major transition at 44° C. Since this is a random copolymer this single major transition is between that of octadecyl acrylate homopolymer and methyl methacrylate homopolymer. When 3 wt.-% of such release agent was combined with the PLA polymer and formed into an oriented film, the major transition at 44° C. is not evident and the PLA transition at 167° C. was about the same indicating miscibility with the PLA polymer.

Smaller transitions can be seen in the expanded DSC curve of FIG. 5. With reference to FIG. 5, the oriented PLA polymer film that contained about 3 wt.-% of ODA-MMA release agent exhibited a very small transition around 38° C. This transition is near the melt point of ODA and may indicate phase separation of the release agent material and migration thereof to the air interface. Surface analysis by XPS (x-ray photoelectron spectroscopy) confirms such phase separation indicating the presence of a carbon rich surface indicative of a long chain (octadecyl) alkyl.

In some embodiments, the (e.g. oriented) PLA-based film substrate further comprises a plasticizer. The total amount of plasticizer in the (e.g. oriented) PLA-based film is typically at least 1, 2, 3, or 4 wt.-% based on total weight of the organic components of the film. In some embodiments, the plasticizer concentration is no greater than 20, 19, 18, 17, 16, or 15 wt.-% based on total weight of the organic components of the film. In this embodiment, the (e.g. oriented) PLA-based film substrate does not exhibit plasticizer migration when aged at 80° C. for 24 hours (according to the test methods described in WO 2016/105998). In some embodiments, this property is attributable to the inclusion of the second (e.g. polyvinyl acetate) polymer.

In some embodiments, the release composition and film thereof may also comprise plasticizer alone or in combination with the second (e.g. polyvinyl acetate) polymer at the concentrations just described. For example, both the release composition and PLA-based film substrate may both comprise polyvinyl acetate polymer and plasticizer as described in WO 2016/105998 and U.S. patent application Ser. No. 62/352,643 filed Jun. 21, 2016. The release composition further comprises the copolymer release agent, whereas the PLA-based film substrate does not comprise such release agent.

However, in other embodiments the release composition and film thereof comprises little or no plasticizer. Hence, the amount of plasticizer is no greater than 4, 3, 2, or 1 wt.-% based on total weight of the release composition or film thereof.

Various plasticizers that are capable of plasticizing PLA have been described in the art. The plasticizers are generally a liquid at 25° C. and typically have a molecular weight (Mw in the case of low molecular weight polymeric plasticizers) ranging from about 200 g/mol to 10,000 g/mol. In some embodiments, the molecular weight of the plasticizer is no greater than 5,000 g/mol. In other embodiments, the molecular weight of the plasticizer is no greater than 4,000, 3,000, 2,000 or 1,000 g/mol. Various combinations of plasticizers may be utilized.

The plasticizer preferably comprises one or more alkyl or aliphatic esters or ether groups. Multi-functional esters and/or ethers are typically preferred. Although alkyl phthalates, such as dibutyl phthalate, comprise aliphatic ester groups, in many preferred embodiments, the plasticizer is not a phthalate plasticizer and may also lack other aromatic groups. These include alkyl phosphate esters, dialkylether diesters, tricarboxylic esters, epoxidized oils and esters, polyesters, polyglycol diesters, alkyl alkylether diesters, aliphatic diesters, alkylether monoesters, citrate esters, dicarboxylic esters, vegetable oils and their derivatives, and esters of glycerine. Such plasticizers generally lack aromatic groups and halogen atoms and are anticipated to be biodegradable. Such plasticizers commonly further comprise linear or branched alkyl terminal groups having a carbon chain length of $C_2$ to $C_{10}$.

In one embodiment, the plasticizer is a bio-based, citrate-based plasticizer represented by the following Formula (III):

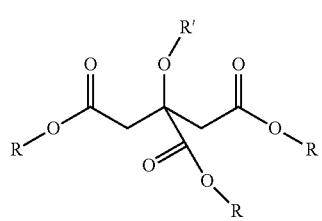

(III)

wherein

R are independently alkyl groups that may be the same or different; and

R' is an H or an ($C_1$ to $C_{10}$) acyl group.

R are typically independently linear or branched alkyl groups having a carbon chain length of $C_1$ to $C_{10}$. In some embodiments, R is a $C_2$ to $C_8$ or $C_2$ to $C_4$ linear alkyl group. In some embodiments, R' is acetyl. In other embodiments, at least one R is a branched alkyl group having a carbon chain length of $C_5$ or greater. In some embodiments, the branched alkyl group has a carbon chain length no greater than 8.

Representative citrate-based plasticizer includes for example triethyl citrate, acetyl triethyl citrate, tributyl citrate, acetyl tributyl citrate, trihexyl citrate, acetyl trihexyl citrate, trioctyl citrate, acetyl trioctyl citrate, butyryl trihexyl citrate, acetyl tris-3-methylbutyl citrate, acetyl tris-2-methylbutyl citrate, acetyl tris-2-ethylhexyl citrate, and acetyl tris-2-octyl citrate. One representative citrate-based plasticizer is acetyl tri-n-butyl citrate, available under the trade designation CITROFLEX A-4 PLASTICIZER™ from Vertellus Specialties, Incorporated, Indianapolis, IN.

In another embodiment, the plasticizer comprises a polyethylene glycol backbone and ester alkyl terminal groups. The molecular weight of the polyethylene glycol segment is typically at least 100, 150 or 200 g/mole and no greater than 1,000 g/mole. In some embodiments, the polyethylene glycol segment has a molecular weight no greater than 900, 800, 700, or 600 g/mole. Examples include polyethylene glycol (400) di-ethylhexonate available from Hallstar, Chicago, IL, under the trade designation "TegMeR™ 809" and tetraethylene glycol di-ethylhexonate available from Hallstar, Chicago, IL, under the trade designation "TegMeR™ 804".

In another embodiment, the plasticizer may be characterized as a polymeric adipate (i.e. a polyester derived from adipic acid) such as commercially available from Eastman, Kingsport, TN, as Admex™ 6995.

In another embodiment, the plasticizer is a substituted or unsubstituted aliphatic polyester, such as described in U.S. Pat. No. 8,158,731; incorporated herein by reference.

In some embodiments, the aliphatic polyester plasticizer comprises repeating units derivable from succinic acid, glutaric acid, adipic acid, and/or sebacic acid. In some embodiments, the polyesters of the polymer blends disclosed herein comprise repeating units derivable from 1,3-propanediol and/or 1,2-propanediol. In some embodiments, the polyesters of the polymer blends disclosed herein comprise one or two terminator units derivable from 1-octanol, 1-decanol, and/or mixtures thereof. In some embodiments, the polyesters of the polymer blends disclosed herein comprise repeating units derivable from succinic acid, glutaric acid, adipic acid, and/or sebacic acid; repeating units derivable from 1,3-propanediol and/or 1,2-propanediol; and one or two terminator units derivable from 1-octanol, 1-decanol, and/or mixtures thereof.

In some embodiments, the aliphatic polyester plasticizer has the following Formula IV:

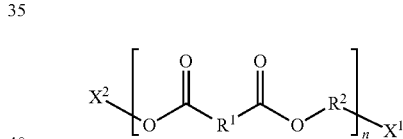

wherein n is 1 to 1000; $R^1$ is selected from the group consisting of a covalent bond and a substituted or unsubstituted aliphatic hydrocarbon group having 1 to 18 carbon atoms; $R^2$ is a substituted or unsubstituted aliphatic hydrocarbon group having 1 to 20 carbon atoms; $X^1$ is selected from the group consisting of —OH, —$O_2C$—$R^1$—$CO_2H$, and —$O_2C$—$R^1$—$CO_2R^3$; $X^2$ is selected from the group consisting of —H, —$R^2$—OH, and $R^3$; and $R^3$ is a substituted or unsubstituted aliphatic hydrocarbon group having 1 to 20 carbon atoms. In some embodiments, the polyester has the above formula with the proviso that if $X^1$ is —OH or —$O_2C$—$R^1$—$CO_2H$, then $X^2$ is $R^3$.

The number of repeat units n is selected such that the aliphatic polyester plasticizer has the previously described molecular weight.

In some embodiments, R', $R^2$, and/or $R^3$ are alkyl groups. $R^1$ alkyl groups can have, for example, from 1 to 18 carbon atoms, from 1 to 10 carbon atoms, from 1 to 8 carbon atoms, from 2 to 7 carbon atoms, from 2 to 6 carbon atoms, from 2 to 5 carbon atoms, from 2 to 4 carbon atoms, and/or 3 carbon atoms. R', for example, can be selected from the group consisting of —$(CH_2)_2$—, —$(CH_2)_3$—, —$(CH_2)_4$—, and —$(CH_2)_8$—. $R^2$ alkyl groups can have, for example, from 1 to 20 carbon atoms, from 1 to 10 carbon atoms, from 1 to 8 carbon atoms, from 2 to 7 carbon atoms, from 2 to 6 carbon atoms, from 2 to 5 carbon atoms, from 2 to 4 carbon atoms, and/or 3 carbon atoms. $R^2$, for example, can be selected from the group consisting of —$(CH_2)_3$—, —$CH_2CH(CH_3)$—, and —$CH(CH_3)CH_2$—. $R^3$ alkyl groups can have, for example, from 1 to 20 carbon atoms, from 1 to 18 carbon atoms, from 2 to 16 carbon atoms, from 3 to 14 carbon atoms, from 4 to 12 carbon atoms, from 6 to 12 carbon atoms, from 8 to 12 carbon atoms, and/or from 8 to 10 carbon atoms. $R^3$, for example, also can be a mixture comprising —$(CH_2)_7CH_3$ and —$(CH_2)_9CH_3$.

In some embodiments, $R^1$ is an alkyl group having from 1 to 10 carbons, $R^2$ is an alkyl group having from 1 to 10 carbons, and $R^3$ is an alkyl group having from 1 to 20 carbons. In other embodiments, $R^1$ is an alkyl group having from 2 to 6 carbons, $R^2$ is an alkyl group having from 2 to 6 carbons, and $R^3$ is an alkyl group having from 8 to 12 carbons. In still other embodiments, $R^1$ is an alkyl group having from 2 to 4 carbons, $R^2$ is an alkyl group having from 2 to 3 carbons, and $R^3$ is an alkyl group having from 8 to 10 carbons. In yet other embodiments, $R^1$ is selected from the group consisting of —$(CH_2)_2$—, —$(CH_2)_3$—, —$(CH_2)_4$—, and —$(CH_2)_8$—, $R^2$ is selected from the group consisting of —$(CH_2)_3$—, —$CH_2CH(CH_3)$—, and —$CH(CH_3)CH_2$—, and $R^3$ is a mixture comprising —$(CH_2)_7CH_3$ and —$(CH_2)_9CH_3$.

The aliphatic polyester plasticizer can have an acid value of about zero to about 20, for example, about 0.001 to about 10, about 0.01 to about 7, about 0.05 to about 5, about 0.1 to about 3, about 0.2 about 2, about 0.3 to about 1, about 2 to about 20, about 5 to about 20, about 8 to about 20, about 10 to about 20, and/or about 12 to about 18. The polyesters also can have an acid value greater than about 20. The acid value of the polyesters can be determined by known methods for measuring the number of milligrams of potassium hydroxide necessary to neutralize the free acids in one gram of polyester sample.

Plasticizer with a low acid value can be preferred for shelf-life stability and/or durability of the film. In some embodiments, the acid value of the plasticizer is preferably no greater than 10, 9, 8, 7, 6, 5, 4, 3, 2 or 1.

The aliphatic polyester plasticizer can have a hydroxyl value of about zero to about 110, for example, about 1 to about 40, about 10 to about 30, about 15 to about 25, about 30 to about 110, about 40 to about 110, about 50 to about 110, and/or about 60 to about 90. The polyesters also can have a hydroxyl value greater than about 110. The hydroxyl value of the polyesters can be determined by known methods for measuring hydroxyl groups, such as the methods described by ASTM Test Method D 4274.

One representative aliphatic polyester plasticizer is available from Hallstar, Chicago, IL, as the trade designation "HALLGREEN R-8010".

In some embodiments, the wt.-% percent of hydroxyl groups relative to the total weight of the plasticizer compound is no greater than 10, 9, 8, 7, 6, 5, 4, 3, 2, 1 wt.-%. In some embodiments the plasticizer compound contains no hydroxyl groups. Thus, in this embodiment, the plasticizer is not glycerol or water.

When low haze is not a consideration, to facilitate the rate of crystallization, a nucleating agent may optionally be present in the PLA (e.g. film) composition. Suitable nucleating agent(s) include for example inorganic minerals, organic compounds, salts of organic acids and imides, finely divided crystalline polymers with a melting point above the processing temperature of PLA, and combinations of two or more of the foregoing. Suitable nucleating agents typically have an average particle size of at least 25 nanometers, or at least 0.1 micron. Combinations of two or more different nucleating agents may also be used.

Examples of useful nucleating agents include, for example, talc (hydrated magnesium silicate $H_2Mg_3(SiO_3)_4$ or $Mg_3Si_4O_{10}(OH)_2$), silica ($SiO_2$), titania ($TiO_2$), alumina ($Al_2O_3$), zinc oxide, sodium salt of saccharin, calcium silicate, sodium benzoate, calcium titanate, aromatic sulfonate derivative, boron nitride, copper phthalocyanine, phthalocyanine, sodium salt of saccharin, isotactic polypropylene, polybutylene terephthalate, and the like.

When an organic nucleating agent is present, the nucleating agent is typically at a concentration of at least 0.01, 0.02, 0.03, 0.04, 0.05, 0.1, 0.15 or 0.2 wt.-% ranging up to about 1, 2, 3, 4 or 5 wt.-% based on the total weight of the (e.g. film) composition. When the nucleating agent is an inorganic oxide filler such as silica, alumina, zinc oxide, and talc, the concentration can be higher.

In one embodiment, the nucleating agent may be characterized as a salt of a phosphorous-containing aromatic organic acid such as zinc phenylphosphonate, magnesium phenylphosphonate, disodium 4-tert-butylphenyl phosponate, and sodium diphenylphosphinates.

One favored nucleating agent is zinc phenylphosphonate having the following chemical formula:

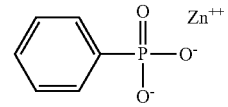

available from Nissan Chemical Industries, Ltd., under the trade designation "Ecopromote™".

In some embodiments, inorganic fillers may be used to prevent blocking or sticking of layers or rolls of the film during storage and transport. Inorganic fillers include clays and minerals, either surface modified or not. Examples include talc, diatomaceous earth, silica, mica, kaolin, titanium dioxide, perlite, and wollastonite.

When low haze is desired, the (e.g. film) composition is typically substantially free of nucleating agent, as well as other additives that increase haze, such as those having a particle size of greater than 100 or 200 nanometers. In this embodiment, the concentration of nucleating agent is less than 0.01, 0.005, 0.001 wt.-%, or 0. Further, the concentration of other additive(s) that increase haze is also typically less than 0.01, 0.005, 0.001 wt.-%.

Organic biomaterial fillers include a variety of forest and agricultural products, either with or without modification. Examples include cellulose, wheat, starch, modified starch, chitin, chitosan, keratin, cellulosic materials derived from agricultural products, gluten, flour, and guar gum. The term "flour" concerns generally a film composition having protein-containing and starch-containing fractions originating from one and the same vegetable source, wherein the protein-containing fraction and the starch-containing fraction have not been separated from one another. Typical proteins present in the flours are globulins, albumins, glutenins, secalins, prolamins, and glutelins. In typical embodiments, the film composition comprises little or no organic biomaterial fillers such a flour. Thus, the concentration of organic biomaterial filler (e.g. flour) is typically less than 10, 9, 8, 7, 6, 5, 4, 3, 2, or 1 wt.-% of the total (e.g. film) composition.

In order to reduce haze, reducing the mismatch of refractive index between an immiscible filler and the polymer blend is an effective strategy. In an oriented film, the thickness index is typically the lowest principal value of the anisotropic refractive indices. In some embodiments it can be advantageous to form an oriented PLA-based polymer blend film with a thickness refractive index (i.e. refractive index in the z-direction) greater than 1.455 at 589 nm.

The (e.g. film) composition may optionally contain one or more conventional additives. Additives include, for example, antioxidants, stabilizers, ultraviolet absorbers, lubricants, processing aids (e.g. slip agents, antiblocking agents), antistatic agents, colorants, impact resistance aids, fillers (e.g. diatomaceous earth), matting agents, flame retardants (e.g. zinc borate), pigments (e.g. titanium dioxide), and the like. Some examples of fillers or pigments include inorganic oxide materials such as zinc oxide, titanium dioxide, silica, carbon black, calcium carbonate, antimony trioxide, metal powders, mica, graphite, talc, ceramic microspheres, glass or polymeric beads or bubbles, fibers, starch and the like.

In some embodiments, the PLA-based film substrate and optionally the release composition and film thereof may further comprise an anti-blocking or "slip" agent such as a fatty acid derivative. One suitable anti-blocking agent is a mixture of PLA polymer, 5-10 wt.-% of a fatty acid derivative and 20 to 40 wt.-% of silica, such as available under the trade designation SUKANO DC S511™ from Sukano Polymers Corporation, Duncan, SC However, the inclusion of slip agent particulates can introduce a small amount of haze and can decrease the optical transmission of the film. It may be advantageous to cast a multilayer film with only one outer layer comprising the slip material to reduce haze in the film construction. However, in typical embodiment the release agent copolymer described herein is the primary or sole release agent. Thus, the release composition contains little or no fatty acid derivative compounds. Thus, the concentration of fatty acid derivative compounds is less than 0.1 or 0.005 wt.-%.

When present, the total amount of additives can be at least 0.1, 0.2, 0.3, 0.4, or 0.5 wt.-%. In some embodiments, the amount of additive is no greater than 5, 4, 3, 2, or 1 wt.-%. In other (e.g. opaque film) embodiments, the amount of (e.g. fillers or pigment) additive is no greater than 25, 20, 15, 10 or 5 wt.-% of the total film composition. In other embodiments, the concentration of additive can range up to 40 wt.-% or more of the total film composition.

The film may be a monolithic film or a film layer of a multilayer film. In some embodiments, the film or film layer is preferably oriented.

When the film is a monolithic film, the thickness of the film is typically at least 10, 15, 20, or 25 microns (1 mil) to 250 microns (10 mils) or even 500 microns (20 mils) thickness. In some embodiments, the thickness of the film is no greater than 500, 250, 200, 150, 100, 50 or 25 microns. The film may be in the form of individual sheets or a (e.g. continuous) roll-good.

When the film is a film layer of a multilayer film, the multilayer film typically has the thickness just described. However, the thickness of the (e.g. PLA-based) film layer may be less than 10 microns. The multilayer films are preferably co-extruded or otherwise stacked construction, such as adhesively laminated together. The PLA-based film composition can be co-extruded with additional layers of similar or different materials. In general, the multilayer, comprising at least one PLA-based release layer as described herein, may comprise 2, 3, 5, 10, 50 or more layers.

In one embodiment, the film layer comprising the PLA-based release composition described herein is an exterior layer or in other words a skin layer. A second (e.g. core) film layer is disposed upon the skin layer. The second film layer typically has a different composition than the skin layer. The second (e.g. core) film layer may comprise the same components as the skin layer in absence of the copolymer release agent. The second (e.g. core) film layer may comprise different components as the skin layer. For example, in one embodiment, the core layer may comprise an amorphous PLA polymer. It is contemplated to have further coextruded layers as well, such as other interlayers between the core and outermost skin layers on either or both sides of the core layer.

In one embodiment, the (e.g. oriented) PLA film comprises a coextruded multilayer structure such as a 3-layer film of skin layer/core layer/adhesive layer wherein the skin and core layer are coextruded and both comprise PLA films. In one embodiment, the (e.g. oriented) PLA film comprises a coextruded multilayer structure such as a 3-layer film of skin layer/core layer/adhesive layer wherein the skin, core layer, and adhesive are coextruded and the skin layer and core layer both comprise PLA films. In this embodiment, the skin layer comprises the (e.g. oriented) PLA release film layer described herein.

In one embodiment of the multilayer structure, the release layer and especially the core layer may comprise or consist of PLA comprising a polyvinyl acetate polymer and/or plasticizer as described in WO2016/105998 or an oriented PLA comprising a second (e.g. polyvinyl acetate) polymer and plasticizer as described in U.S. patent application Ser. No. 62/352,643 filed Jun. 21, 2016. The miscibility of the mixture is evidenced by the fact that the composition, in the form of a cast unoriented film, exhibits a single Tg as measured according to the test method described in the examples. The composition, in the form of a cast unoriented film, typically exhibits a single midpoint (half-height) Tg of at least 40, 41 or 42° C. ranging up to 47, 48, 49, 50° C. or greater. In some embodiments, the (half-height) midpoint Tg ranges up to 55, 60, or 65° C.

In another embodiment of the multilayer structure, the core layer may contain other biodegradable polymers, such as polyhydroxybutyrate-valerate, polycaprolactone, polybutylene-adipate-co-terephthalate, polybutylene-succinate, polybutylene-succinate-adipate, or mixtures thereof.

The general processes for making an oriented PLA-based films are described in the art, e.g. by U.S. Pat. No. 5,443,780 and No. 6136905, as well as by the review article by Lim et al., *Process Technologies for Poly(lactic acid)*, Progress in Polym. Sci., 33 (2008), pp 820-852. The method comprises providing a monolithic or multilayer layer (such as the 2-layer and-3 layers films just described) and stretching the film in at least one direction such that the film is oriented. PLA is a moisture sensitive resin and should be dried before or during extrusion to prevent degradation. The drying can be done by any means known in the art. One well-known means employs ovens or a more sophisticated heated vacuum and/or desiccant hopper-dryers to dry resin prior to its being fed to an extruder. Typically the polymer is dried to a water content of less than 250, 200, 150, 100, or 50 ppm. Drying of the PLA typically takes place in the temperature range from 70-100° C. for semi-crystalline grades of PLA polymer. Amorphous grades are typically dried below the Tg (typically about 60° C.) to prevent the polymer pellets from sticking together prior to melt blending or extrusion. Another means employs a vacuum-vented twin-screw extruder to remove moisture from the resin while it is being extruded. Drying time and temperature should be limited to prevent thermal degradation or sticking during hopper-dryer or oven drying. In addition, resins coextruded with moisture sensitive resins are also dried to prevent damage to the moisture sensitive coextruded (e.g. PLA) resin.

In some instances following mixing, the PLA-based film can be formed by methods that afford a non-oriented film. In some embodiments, the PLA-based film composition is transferred to a press and then compressed and solidified to form individual sheets of PLA film. In other embodiments, the PLA-based film composition may be extruded through a die onto a casting roll maintained at a suitable cooling temperature to form a continuous length of PLA-based film.

When the oriented PLA-based film is formed via extrusion, conditions are chosen to adequately feed, melt, mix and pump the polymer resin feed streams in a continuous and stable manner. In some embodiments, it may be advantageous to pre-compound the materials in a separate process (e.g. using a brabender, mixer, kneader or extruder). The compounded and re-pelletized materials are then extruded in a second process to form the film. In either case, when adding low glass transition temperature (Tg) materials like polyvinyl acetate, active feed throat cooling is often utilized to prevent clogging of the feed throat. Proper screw design as known in the art can ensure mixing of the various components. Liquid materials can be preheated, e.g. to over 100° C., and introduced through an active feed port using a pumping system often equipped with an independent mass flow meter. Such liquid materials may be introduced prior to a final mixing zone and also prior to a vacuum drying zone. The extrusion temperature is selected such that it is greater than the melting temperature (Tm) of the PLA-based film composition described herein. The extrusion temperature is typically at least 20, 30, 40, or 50° C. greater than the melting temperature. When the extrusion temperature is too low, extrusion stability is difficult to obtain. When the extrusion temperature it is too high, the composition can be subject to thermal degradation. Final melt stream temperatures are thus chosen within a range which avoids freezing, crystallization or unduly high pressure drops at the low end of the temperature range and which avoids degradation at the high end of the temperature range. For example, polylactic acid resin is dried at 70° C. for 8 hours and then fed with polyvinyl acetate into an extruder throat actively cooled to 90° C. or less and then through the extruder with increasing zone temperatures, or melt temperatures, up to a final setting preferably between 175° C. and 230° C. and more preferably between 185° C. and 205° C.

Following the flow from the extruder, the melt streams are then filtered to remove undesirable particles and gels. Primary and secondary filters known in the art of polyester film manufacture may be used, with mesh sizes in the 1-30 micrometer range. While the prior art indicates the importance of such filtration to film cleanliness and surface properties, its significance in the present invention extends to layer uniformity as well. In the case of a multilayer co-extrusion, each melt stream is conveyed, e.g. through a neck tube, into a gear pump used to regulate the continuous and uniform rate of polymer flow. A static mixing unit may be placed at the end of the neck tube carrying the melt from the gear pump into the multilayer feedblock, in order to ensure uniform melt stream temperature. The entire melt stream is heated as uniformly as possible to ensure both uniform flow and minimal degradation during processing.

The film is cast from the die either directly onto a chill wheel or blown and then quenched. The die orifice can have circular or linear slits. The die temperature is typically about the same as the range of the final extrusion and melt train temperatures.

When the film is cast directly onto a roll, it may be cast between nips or cast onto a single quench wheel as assisted by electrostatic pinning, the details of which are well-known in the art of polyester film manufacture. Care should be exercised in setting the parameters of the electrostatic pinning apparatus. Periodic cast web thickness variations along the extrusion direction of the film, frequently referred to as "pinning chatter," are minimized. Adjustments to the current, voltage, pinning wire thickness, and pinning wire location with respect to the die and the casting chill roll are all known to have an effect and are selected accordingly by one skilled in the art. When the film is cast onto a quench roll with electrostatic pinning, the film may be cast to a uniform thickness across the web or a deliberate profiling of the web thickness may be induced using die lip controls. Such profiles may improve uniformity by the end of the film process. In other embodiments, a uniform cast thickness provides best uniformity at the end of the film process. Controlling vibrations in the process equipment is also important to reduce "chatter" in the cast film.

One major surface of the film can have a different surface texture and/or different degree of crystallinity and/or other properties relative to the opposing major surface. This difference can be due to wheel contact on one side and merely air contact on the other. This can be desirable in some applications and undesirable in others. When minimization of such differences is desired, a nip roll can be used in combination with the casting roll to enhance quenching or to provide smoothing onto what would otherwise be the air side of the cast film. To minimize surface haze, smooth finishes are desired for both the casting wheel and the optional nip roll.

The casting roll can have a structured surface, such as a matte surface. Further, the PLA-based film can also be embossed to impart a structured surface prior to or after orientation.

The casting wheel temperature also impacts the level of crystallization that forms during quenching on the casting roll. To reduce haze, it is usually desirable to minimize this quenching temperature without causing moisture condensation on the wheel. On the other hand, the release material can cause slippage on the wheel causing casting defects if the wheel is not hot enough. Thus the casting wheel temperature, depending on ambient conditions and these optimization factors, typically ranges from 15° C. to, 45, 50, 55, or 60° C.

The non-oriented films may be uniaxially or biaxially stretched, e.g. using batch or continuous stretching processes according to known methods. (See e.g., L. T. Lim, R. Auras, and M. Rubino, "Processing Technologies for Poly (lactic acid)," Progress in Polymer Science 33[2008]820-852). The two principal in-plane directions for the application of stretching are typically called the machine direction (MD) and transverse direction (TD) for a continuously fed stretching process. The machine direction is the direction of film travel from extrusion to winding. In a batch process, these terms may be applied by orienting the actual cast film into the device for stretching in the corresponding manner to these references.

A continuous process for longitudinal stretching can be done by pull rolls, e.g. in a so-called length orienter. The film is heated, ultimately stretched by the increasing ratio of angular velocity of these rolls and then quenched. Transverse stretching can be done in a tenter oven which grips the film at its edges and then increases the distances between these grippers in TD as the film continues to proceed along MD. If desired, the film can be bi-axially oriented simultaneously using a variety of known "simo-biax" tenters.

Temperature has a major effect on the characteristic average longest relaxation time of the material, and is thus a major factor in determining whether a given material experiences a weak (non-orienting) or strong (orienting) flow. The dependence of the characteristic average longest relaxation time on temperature can be quantified by the well-known WLF equation [See, J. D. Ferry, Viscoelastic Properties of Polymers, John Wiley & Sons, New York, 1970]. This equation contains three parameters, $c_1$, $c_2$ and $T_0$. Often, $T_0$ is associated with the glass transition temperature, (Tg). Using the approximate "universal" values for $c_1$ and $c_2$, applicable as a first estimate for many polymers, the WLF equation shows the large dependence on relaxation times with temperature. For example, using a relaxation time at 5° C. higher than the glass transition temperature (Tg) as a value for comparison, the relaxation times at 10° C., 15° C. and 20° C. higher than Tg are approximately 20, 250 and 2000 times shorter, respectively. Greater accuracy for WLF parameters can be obtained by using empirical curve fitting techniques. Thus, to a first approximation, the single most important parameter for temperature effects on the characteristic time is Tg. The larger the temperature difference between the web temperature and Tg, the smaller the characteristic time and thus the weaker the draw flow. The glass transition temperature (Tg) of the PLA-blend may be measured using DSC, as described in U.S. patent application Ser. No. 62/352,643 filed Jun. 21, 2016. The stretching temperature is typically at least 1, 5, 10, 20, 30, 40, or 50° C. greater than the (e.g. midpoint) glass transition temperature (Tg) of the PLA-based film composition described herein. When the stretching temperature is too low, stretching may be difficult, whereas when the stretching temperature is too high, the uniformity in thickness and mechanical strength may be compromised. Considering the well-known time/temperature principal for polymer visco-elasticity, the draw temperature is also adjusted according to the draw rate of the process. Typical draw rates can range between 10 and 10,000%/sec. At high temperatures and/or low strain rates, polymers tend to flow when drawn like a viscous liquid with little or no molecular orientation. At low temperatures and/or high strain rates, polymers tend to draw elastically like solids with concomitant molecular orientation. In order to achieve molecular orientation, the film must be drawn fast enough with respect to the given temperature. It will be appreciated that the response of a given PLA blend composition can be altered by controlling the drawing temperature, rate and draw ratio of the process. A process which occurs in a short enough time and/or at a cold enough temperature to induce substantial molecular orientation is an orienting or strong draw process. A process which occurs over a long enough period and/or at hot enough temperatures such that little or no molecular orientation occurs is a non-orienting or weak process. To achieve orientation via a strong flow, stretching temperatures are generally chosen as no more than 40° C. and more preferably no more than 30° C. above the $T_g$ prior to the onset of strain-induced crystallization. Further, it is reiterated that this discussion is most pertinent to the draw process prior to crystallization, especially strain induced crystallization. After crystallization occurs, the presence of crystals can further retard relaxation times and convert otherwise weak flows to strong flows. Thus, temperatures in the tenter sequentially following a length orientation are typically higher than those in the length orienter, while initial temperatures in a uniaxial tenter process or simultaneously biaxial process are intermediate between these.

The selection of the PLA (and polyvinyl acetate resins as well as the plasticizer when present) affect the resulting relaxation times of the polymer blend. Besides the resulting glass transition temperature (Tg), the weight average molecular weight is a particularly significant factor. For a given composition, the characteristic time tends to increase as a function of molecular weight (typically as the 3 to 3.5 power of molecular weight) for polymers whose molecular weight is well above the entanglement threshold. Ingeo™ grades 6062D, 4032D and 4060 available from NatureWorks, LLC, Minnetonka, MN, are examples of such entangled PLA polymers. Likewise Vinnapas™ grades B60, UHWFS2 and UHWFS25 available from Wacker are examples of entangled polyvinyl acetate polymers. For unentangled polymers, the characteristic time tends to increase as a weaker function of molecular weight. Low molecular weight plasticizers tend to not only shift the glass transition temperature (Tg) but also weaken the entanglement density and reduce the characteristic longest relaxation times. Addition of such low molecular weight materials thus can also be used to adjust the rheological properties as long as detrimental effects such as brittleness and phase separation are not manifest.

Another parameter of importance is the extent of the draw process, as characterized by the draw ratio. As used herein, draw ratio refers to the ratio of a final dimension to initial dimension in a given direction. Strong draw processes typically need enough duration (that is, a high enough draw ratio) to accomplish sufficient orientation, e.g. to exceed the threshold for strain-induced crystallization, thereby achieving high birefringence in the PLA material. Thus, the strain rate history profile, which is the collection of the instantaneous strain rates over the course of the drawing sequence, is considered for determining the draw process. The accumulation of the instantaneous strain rates over the entire draw process determines the final draw ratio. The temperature and strain rate draw profile history help determine the draw ratio at which the polymer experiences the onset of strain-induced crystallization, given the characteristic time and supercooling of that polymer. For PLA, experimental evidence suggests this onset draw ratio has a limit between 1.5 and 2 at high rates of strain. At lower rates of strain, for films with negligible crystallization during casting, the onset draw ratio for PLA can be over 3. The final level of orientation often correlates with the ratio of the final draw ratio to the onset draw ratio.

When the cast film comprises nucleating agents, crystallization with the resulting suppression of molecular relaxation may be present before stretching. Any stretching may then present a strong flow situation. If the crystallization is not too high, an oriented film may still be formed in some cases by drawing the film near its melting point in analogy to polypropylene processing.

The machine and/or transverse stretching may be performed in a single stage or plural stages. In some embodiments, PLA-based film is uniaxially or biaxially drawn at a draw ratio of at least 1.5, 2.0, 2.5, 3.0, 3.5 or 4 times in either the machine direction (MD), the transverse direction (TD) of the film or both. In some cases, the transverse direction drawn is to a larger extent, but typically no greater than 8, 7, 6 or 5 times. These higher draw ratios are particularly useful for making a hand tearable film along the TD direction.

In some embodiments, the PLA-based film is uniaxially stretched in the transverse direction. In this embodiment, the PLA-based film may be drawn a minor amount in machine direction. For example, the machine direction (MD) draw ratio of the film is typically less than 2.0, 1.5, 1.4, or 1.3.

In other embodiments, the PLA-based film is biaxially stretched in both the transverse and machine direction. In this embodiment, the PLA-based film is drawn at a draw ratio of at least 2.0, 2.5, 3.0, 3.5 or 4 times in both the transverse direction (TD) and machine direction (MD) of the film.

Sometimes it is desirable to draw the film in such a way that one or more properties, measured on the finished films, have identical values in the machine and transverse directions. Such films are often referred to as "balanced" films. Machine- and transverse-direction balance can be achieved by selecting process conditions using techniques well known in the art of biaxially oriented film making. Typically, process parameters explored include machine-direction orientation preheat temperature, stretch temperature, and draw ratio, tenter preheat temperature, tenter stretch temperature, and tenter draw ratio, and, sometimes, parameters related to the post-stretching zones of the tenter. Other parameters may also be significant. Typically, designed experiments are performed and analyzed to arrive at appropriate combinations of conditions. Those skilled in the art will appreciate the need to perform such an assessment individually for each film construction and each film line on which it is to be made.

The films may be heat set after stretching at temperatures at or above the stretching temperature and below the crystalline melting point of the film. After stretching, the film may be strain-relaxed before, during and/or after heat setting. Such strain relaxation is a physical reduction in the draw ratio, e.g. by the reduction in spacing of the gripping elements holding the film in the stretching process. An example of this is a so-called "toe-in" of the tenter rails. Such a strain relaxation may be generically referred to a "toe-in" in this description, for either a batch or continuous operation. Toe-in may be performed in one direction, e.g. TD, or in both the MD and TD. A simultaneous biaxial tenter can perform such two-directional tow-ins in a continuous film stretching process. The film may be furthermore wound into a roll of film, optionally slit to a desired width.

Heat setting can also be useful in improving other properties, such as dimensional stability (with regard to both temperature and humidity) and interlayer adhesion. Finally, tension conditions at quenching, prior to winding, can also affect physical properties, such as shrinkage. Reduced winding tension and reduced cross web tension via a toe in (reduction in transverse draw ratio) can also reduce shrinkage. Post-winding heat treatment of film rolls and re-winding can also be used to improve dimensional stability and roll formation. Thus, the various properties of dimensional stability (such as shrinkage at elevated temperature and reversible coefficient of thermal expansion) are affected by a variety of process conditions in addition to the selection of PLA and polyvinyl acetate polymer. Such parameters include, but are not limited to, heat set temperature, heat set duration, transverse direction dimensional relaxation ("toe-in") both in extent and placement before, during and after heat set e.g. during web cooling, web tension, and heat "soaking" (or annealing) after winding into rolls. Again, designed experiments can be performed by one skilled in the art to determine optimum conditions for a given set of dimensional stability requirements, for a given film composition, and for a given film line.

Finally, it should be noted that the temperature of the film during pre-heating, stretching and heat setting in the various process zones can be controlled by roll heating (e.g. in a length orienter) and oven zoning (e.g. in a tenter). Moreover, both crossweb and downweb heating can be further controlled at any point in the process using infrared heaters. One skilled in the art will appreciate the many options for zoning and controlling the addition of infrared heat. Further, the possibilities for combining infrared edge heating with changes in the cast web's cross-web thickness profile will also be apparent.

Multilayer co-extrusion of PLA-based film compositions include the general considerations for generating precise, uniform and stable layers as known in the art. In general, co-extrusion resulting in uniform, well-formed layers requires multilayer flow stability. This is achieved by matching or balancing the rheological properties, such as viscosity and elasticity, between the materials of the various layers to within a certain tolerance. The level of required tolerance or balance also depends on the materials selected for the internal skin layers (e.g. protective boundary layers "PBL") and final skin layers that reside in the high shear zone near the walls of the various flow channels, e.g. in the feedblock, multiplier and/or die. For flow stability of low elasticity, the typical ratio between high and low viscosity materials is no more than 4:1, preferably no more than 2:1, and most preferably no more than 1.5:1 for the process conditions typical of feedblocks, multipliers, and dies. Using the lower viscosity materials in the PBLs and skin layers usually enhances flow stability.

It is often preferable for all polymers entering the multilayer feedblock to be at the same or very similar melt temperatures. This may require process compromise if two polymers, whose ideal melt processing temperatures do not match, are to be coextruded. One technique found to be useful in this regard is to start up the more temperature sensitive resins melt trains at their more conventional processing temperatures, and then to raise the melt train temperatures to the higher temperature desirable for the other co-extruded layers only at or just prior to material layer contact, e.g. into the feedblock or die. Temperature control is important in the feedblock and subsequent flow leading to casting at the die lip.

Shear rate is observed to affect viscosity and other rheological properties, such as elasticity. Flow stability sometimes appears to improve by matching the relative shape of the viscosity (or other rheological function) versus shear rate curves of the coextruded polymers. In other words, minimization of maximal mismatch between such curves may be an appropriate objective for flow stability. Thus, temperature differences at various stages in the flow can help to balance shear or other flow rate differences over the course of that flow. Thus, while temperature uniformity is often desired, in some cases, deliberate temperature gradients in the feedblock or temperature differences of up to about 40° C. in the feed streams can be used to narrow or widen crossweb layer thickness distributions. Feed streams into the various outer (or "skin") layers and inner (or "core") layers can also be set at different temperatures than the feedblock average temperature. Often, the outer or skin layers may be set up to 40° C. higher than the feed stream temperature to reduce viscosity or elasticity in these outer layers, e.g. to reduce edge encapsulation of the core layers. Sometimes, the outer layer temperatures can be decreased up to about 40° C. to improve the rheology matching between them and the rest of the flow stream. For example, decreasing the temperature of a low viscosity skin may enhance viscosity matching and enhance flow stability. Other times, elastic effects need to be matched. It will also be evident to one skilled in the art that viscosity and other rheological matching for good co-extrusion can be achieved using various combinations thinning and thickening agents. Thinning agents include lower molecular weight (e.g. polyvinyl acetate) polymers and plasticizers while thickening agents may include fillers and so-called chain extender additives such as Joncryl™, available from BASF. Other chain extenders for polyester include but are not limited to: anhydride (such as maleic anhydride, phthalic anhydride and pyromelletic dianhydride), epoxide, and isocyanate functionalized molecules.

By selecting the materials and process conditions in consideration of the orienting/non-orienting response of the materials, a film can be constructed such that the materials of the various layers have draw compatibility; that is, the multilayer can be stretched resulting in a film with an oriented layer of the PLA-based composition described herein. Temperatures for drawing are generally chosen so that each layer is above its glass transition temperature (Tg). Using time/temperature principals well-known in the art, draw rates are likewise set. Draw ratios are also set to avoid voiding, cracks and breakage using the behavior of the monolithic films of each component layer as a guide. In this manner, the multilayer film can stretch without voiding, cracking and/or breaking. Moreover, the temperature and rate are chosen to result in a strong orienting flow for the PLA-based composition of the film layer. The draw conditions can also be chosen to take advantage of the different visco-elastic characteristics of the various layers.

In one set of multilayer constructions, the multilayer comprises layers of various PLA-based compositions of similar drawing properties.

In another set of multilayer constructions, the PLA-blend layer material is oriented and birefringent and at least some of the other layers remain essentially unoriented. That is, the process is a strong draw process for the PLA-blend material and a weak draw process for these other materials.

In another consideration, adhesion between layers in a multilayer film is often adversely affected by drawing, with stretched films frequently being much more prone to exfoliation of layers than the cast webs from which they were made. However, thinner layers often exhibit improved interlayer adhesion for the same composition. Material selection, processing conditions including the ultimate level of draw ratio, and final thicknesses of the various layers need to be considered to optimize and balance interlayer adhesion with the other desired properties of the film.

The (e.g. oriented) film and film compositions can have various properties, as determined by the test methods set forth in the examples.

In general, the birefringence (i.e. the difference in refractive index between two or more principal directions of the dielectric tensor) of a polymer experiencing a strong flow deformation tends to increase with the draw ratio. Typically, the principal directions of the anisotropic index of refraction are two orthogonal in-plane directions and the thickness direction. In some cases, the two in-plane principal directions can be approximated by the two drawing directions MD and TD, e.g. in the center of the film or in the center of a roll cut from such a central portion. Process non-uniformities like so-called "bowback" and non-uniform temperature fields can cause rotation of these principal axes as a function of the crossweb position. (Uniform directionality of the optical axes is usually desirable for enhanced yield and performance. Processes that limit such bowing and rotation, such as tension control or isolation via mechanical or thermal methods, can be used.) Under such circumstances, the principal values are the highest and lowest orthogonal values measured. For simplicity of discussion, the MD and TD in-plane refractive indices are assumed in the description of the present invention to closely approximate those of the principal directions in-plane. In the general case of the present invention, the principal values along the principal directions are the operative values for calculation of birefringence.

For PLA-blends incorporated in the oriented films of the present invention, stretching tends to increase indices along directions of stretching and lower them along non-stretched directions. When oriented, these polymeric blends exhibit birefringence, i.e. as derived from an anisotropic set of principal refractive indices. Three birefringences can be derived from these three principal refractive indices: the in-plane birefringence between the two in-plane directions, the MD out-of-plane birefringence (defined as the difference between the MD and thickness indices) and the TD out-of-plane birefringence (defined as the difference between the TD and thickness indices). Note that the difference between the latter two birefringences results in the first. Because absolute levels of refractive index often vary between mixtures, birefringence often can be a more useful measure for comparisons. Because the thickness refractive index is typically the lowest after orientation, the out-of-plane birefringences are the most useful in characterizing the relative overall level of orientation. (In the general case, wherein the principal directions for the refractive indices are rotated away from MD and TD, the principal values, i.e. the maximum and minimum values in-plane, are used to calculate the out-of-plane birefringences and total birefringence.) The sum of the out-of-plane birefringences, herewith defined as the "total birefringence," is also a useful measure for the total level of orientation. An extremely highly oriented film of pure PLA made using a high molecular weight resin of low D-lactide content, such as Natureworks™ Ingeo™ 4032 D, can achieve a total birefringence of at least 0.005, 0.010, 0.015, 0.020, 0.025, 0.030, 0.032 or more.

Both mechanical and optical properties often correlate with birefringence. Thus control of the birefringence often translates to a first approximation to control of the birefringence. (Since elastic moduli are a higher order tensor for anisotropic materials, such properties are also affected by additional considerations like the morphology of the developed semi-crystalline network.) Because of strain-induced crystallization, for a given draw process there may be a certain draw ratio at which this birefringence begins to increase more dramatically. After onset of crystallization, the slope may again change (e.g. drop) due to changes in the relative amount of continued nucleation and growth with further drawing. For PLA-based release compositions described herein, a typical refractive index for the unoriented polymer blend is between 1.45 and 1.47 at 632.8 nm. Oriented films of the present invention typically exhibit at least one out-of-plane birefringence of at least 0.005, and more preferably at least 0.01, at 632.8 nm. Oriented films of the present invention also exhibit a high total birefringence. When the total birefringence is adjusted for the total PLA content in the film (i.e. the measured total birefringence is divided by the weight fraction of PLA in the blend to form an "effective" total birefringence), films of the present invention can achieve effective total birefringences approaching the pure PLA values. Effective total birefringence for the films of the present invention are typically 0.015 or more. For biaxially oriented films, the effective total birefringence is preferably at least 0.020, more preferably at least 0.022 and still more preferably 0.025 or more.

When the film is uniaxially stretched, or biaxially stretched asymmetrically, and when the film is sufficiently thin, (e.g. a thickness between 15 and 75 microns) the film or a laminate comprising the film, may be hand-tearable along the direction of major stretching. In these cases, the film may exhibit neat tear initiation and reasonably straight tear propagation along this axis. In addition, the film may exhibit resistance to tear initiation in the perpendicular direction.

The (e.g. oriented) PLA-based films described herein can be used in a variety of products such as a tape backing.

The oriented PLA-based films can exhibit hand tearability, as can be determined by the test method described in as described in U.S. patent application Ser. No. 62/352,643 filed Jun. 21, 2016. The thickness of the hand tearable (e.g. orented) films comprising a release layer is typically no greater than 100 microns, 75 microns, 50, microns and in some embodiments no greater than 35 microns, 25 microns, or less than 25 microns. In some embodiments, the oriented film tears cleanly (defined as the deformation zone of the film where a jagged nub or stretched portion of the film extended was no more than 2 mm from the site of tear initiation at the film edge). These properties can be particularly advantageous for packaging film, tape backing, as well as other uses.

The (e.g. oriented) film can be evaluated utilizing standard tensile testing according to ASTM D882-10.

When the (e.g. biaxially) oriented film (such as the core layer) further comprises a second polymer such as PVAc and a plasticizer, the film can exhibit two Tgs. The first midpoint Tg, believed to be associated with the miscible mixture of PLA, polyvinyl acetate and plasticizer is in the same range as the composition, and cast unoriented film prepared from such composition. Thus, the first midpoint Tg is typically at least 40, 41 or 42° C. ranging up to 47, 48, 49, 50° C. or even 55, 60 or 65° C. The second Tg is typically greater than 0, 1, 2, 3, 4, or 5° C. and may range up to 10, 15, 20 or 25° C. The oriented films were found to possess crystallinity. The crystallinity was typically at least 5, 10, 15, 20, 25, or 30% ranging up to 45 or 50%. Upon adjusting the crystallinity on a PLA wt. % basis (dividing the measured crystallinity by the weight fraction of PLA), the crystallinities were found to be 56%, 55%, 56%, 56% and 57%.

The (e.g. oriented) PLA-based film described herein is suitable for use as a backing of a (e.g. pressure sensitive) adhesive article. Thus, articles are described comprising the (e.g. oriented) PLA-based film described herein and an adhesive (e.g. layer) disposed proximate a major (planar) surface of the (e.g. oriented) PLA-based film. The adhesive may be applied directly to the (e.g. oriented) PLA-based film or a primer may be disposed between the (e.g. oriented) PLA-based film and the adhesive. The article may be in the form of individual sheets or a (e.g. continuous) roll-good.

The PLA-based film may be subjected to customary surface treatments for better adhesion with the adjacent pressure sensitive adhesive layer. Surface treatments include for example exposure to ozone, exposure to flame, exposure to a high-voltage electric shock, treatment with ionizing radiation, and other chemical or physical oxidation treatments. Chemical surface treatments include primers. Examples of suitable primers include chlorinated polyolefins, polyamides, and modified polymers disclosed in U.S. Pat. Nos. 5,677,376, 5,623,010 and those disclosed in WO 98/15601 and WO 99/03907, and other modified acrylic polymers. In one embodiment, the primer is an organic solvent based primer comprising acrylate polymer, chlorinated polyolefin, and epoxy resin as available from 3M Company as "3M™ Primer 94".

Various (e.g. pressure sensitive) adhesives can be applied to the PLA-based film such as natural or synthetic rubber-based pressure sensitive adhesives, acrylic pressure sensitive adhesives, vinyl alkyl ether pressure sensitive adhesives, silicone pressure sensitive adhesives, polyester pressure sensitive adhesives, polyamide pressure sensitive adhesives, poly-alpha-olefins, polyurethane pressure sensitive adhesives, and styrenic block copolymer based pressure sensitive adhesives. Pressure sensitive adhesives generally have a storage modulus (E') as can be measured by Dynamic Mechanical Analysis at room temperature (25° C.) of less than $3 \times 10^6$ dynes/cm at a frequency of 1 Hz.

In certain embodiments, the pressure sensitive adhesive may be natural-rubber-based, meaning that a natural rubber elastomer or elastomers make up at least about 20 wt. % of the elastomeric components of the adhesive (not including any filler, tackifying resin, etc.). In further embodiments, the natural rubber elastomer makes up at least about 50 wt. %, or at least about 80 wt. %, of the elastomeric components of the adhesive. In some embodiments, the natural rubber elastomer may be blended with one or more block copolymer thermoplastic elastomers (e.g., of the general type available under the trade designation KRATON from Kraton Polymers, Houston, TX). In specific embodiments, the natural rubber elastomer may be blended with a styrene-isoprene radial block copolymer), in combination with natural rubber elastomer, along with at least one tackifying resin. Adhesive compositions of this type are disclosed in further detail in US Patent Application Publication 2003/0215628 to Ma et al., incorporated by reference.

The pressure sensitive adhesives may be organic solvent-based, a water-based emulsion, hot melt (e.g. such as described in U.S. Pat. No. 6,294,249), heat activatable, as well as an actinic radiation (e.g. e-beam, ultraviolet) curable pressure sensitive adhesive. The heat activatable adhesives can be prepared from the same classes as previously described for the pressure sensitive adhesive. However, the components and concentrations thereof are selected such that the adhesive is heat activatable, rather than pressure sensitive, or a combination thereof.

In some embodiments, the adhesive layer is a repositionable adhesive layer. The term "repositionable" refers to the ability to be, at least initially, repeatedly adhered to and removed from a substrate without substantial loss of adhesion capability. A repositionable adhesive usually has a peel strength, at least initially, to the substrate surface lower than that for a conventional aggressively tacky PSA. Suitable repositionable adhesives include the adhesive types used on CONTROLTAC Plus Film brand and on SCOTCHLITE Plus Sheeting brand, both made by Minnesota Mining and Manufacturing Company, St. Paul, Minnesota, USA.

The adhesive layer may also be a structured adhesive layer or an adhesive layer having at least one microstructured surface. Upon application of film article comprising such a structured adhesive layer to a substrate surface, a network of channels or the like exists between the film article and the substrate surface. The presence of such channels or the like allows air to pass laterally through the adhesive layer and thus allows air to escape from beneath the film article and the surface substrate during application.

Topologically structured adhesives may also be used to provide a repositionable adhesive. For example, relatively large scale embossing of an adhesive has been described to permanently reduce the pressure sensitive adhesive/substrate contact area and hence the bonding strength of the pressure sensitive adhesive. Various topologies include concave and convex V-grooves, diamonds, cups, hemispheres, cones, volcanoes and other three dimensional shapes all having top surface areas significantly smaller than the base surface of the adhesive layer. In general, these topologies provide adhesive sheets, films and tapes with lower peel adhesion values in comparison with smooth surfaced adhesive layers. In many cases, the topologically structured surface adhesives also display a slow build in adhesion with increasing contact time.

An adhesive layer having a microstructured adhesive surface may comprise a uniform distribution of adhesive or composite adhesive "pegs" over the functional portion of an adhesive surface and protruding outwardly from the adhesive surface. A film article comprising such an adhesive layer provides a sheet material that is repositionable when it is laid on a substrate surface (See U.S. Pat. No. 5,296,277). Such an adhesive layer also requires a coincident microstructured release liner to protect the adhesive pegs during storage and processing. The formation of the microstructured adhesive surface can be also achieved for example by coating the adhesive onto a release liner having a corresponding micro-embossed pattern or compressing the adhesive, e.g. a PSA, against a release liner having a corresponding micro-embossed pattern as described in WO 98/29516.

If desired, the adhesive layer may comprise multiple sub-layers of adhesives to give a combination adhesive layer assembly. For example, the adhesive layer may comprise a sub-layer of a hot-melt adhesive with a continuous or discontinuous overlayer of PSA or repositionable adhesive.

The acrylic pressure sensitive adhesives may be produced by free-radical polymerization technique such as solution polymerization, bulk polymerization, or emulsion polymerization. The acrylic polymer may be of any type such as a random copolymer, a block copolymer, or a graft polymer. The polymerization may employ any of polymerization initiators and chain-transfer agents generally used.

The acrylic pressure sensitive adhesive comprises polymerized units of one or more (meth)acrylate ester monomers derived from a (e.g. non-tertiary) alcohol containing 1 to 14 carbon atoms and preferably an average of 4 to 12 carbon atoms. Examples of monomers include the esters of either acrylic acid or methacrylic acid with non-tertiary alcohols such as ethanol, 1-propanol, 2-propanol, 1-butanol, 2-butanol, 1-pentanol, 2-pentanol, 3-pentanol, 2-methyl-1-butanol, 3-methyl-1-butanol, 1-hexanol, 2-hexanol, 2-methyl-1-pentanol, 3-methyl-1-pentanol, 2-ethyl-1-butanol; 3,5,5-trimethyl-1-hexanol, 3-heptanol, 1-octanol, 2-octanol, isooctyl-alcohol, 2-ethyl-1-hexanol, 1-decanol, 2-propylheptanol, 1-dodecanol, 1-tridecanol, 1-tetradecanol, and the like.

The acrylic pressure sensitive adhesive comprises polymerized units of one or more low Tg (meth)acrylate monomers, i.e. a (meth)acrylate monomer when reacted to form a homopolymer has a $T_g$ no greater than 0° C. In some embodiments, the low Tg monomer has a $T_g$ no greater than −5° C., or no greater than −10° C. The Tg of these homopolymers is often greater than or equal to −80° C., greater than or equal to −70° C., greater than or equal to −60° C., or greater than or equal to −50° C.

The low Tg monomer may have the Formula 5:

wherein $R^1$ is H or methyl and $R^8$ is an alkyl with 1 to 22 carbons or a heteroalkyl with 2 to 20 carbons and 1 to 6 heteroatoms selected from oxygen or sulfur. The alkyl or heteroalkyl group can be linear, branched, cyclic, or a combination thereof.

Exemplary low Tg monomers include for example ethyl acrylate, n-propyl acrylate, n-butyl acrylate, isobutyl acrylate, t-butyl acrylate, n-pentyl acrylate, isoamyl acrylate, n-hexyl acrylate, 2-methylbutyl acrylate, 2-ethylhexyl acrylate, 4-methyl-2-pentyl acrylate, n-octyl acrylate, 2-octyl acrylate, isooctyl acrylate, isononyl acrylate, decyl acrylate, isodecyl acrylate, lauryl acrylate, isotridecyl acrylate, octadecyl acrylate, and dodecyl acrylate.

Low Tg heteroalkyl acrylate monomers include, but are not limited to, 2-methoxyethyl acrylate and 2-ethoxyethyl acrylate.

In typical embodiments, the acrylic pressure sensitive adhesive comprises polymerized units of at least one low Tg monomer(s) having an alkyl group with 6 to 20 carbon atoms. In some embodiments, the low Tg monomer has an alkyl group with 7 or 8 carbon atoms. Exemplary monomers include, but are not limited to, 2-ethylhexyl (meth)acrylate, isooctyl (meth)acrylate, n-octyl (meth)acrylate, isodecyl (meth)acrylate, lauryl (meth)acrylate, as well as esters of (meth)acrylic acid with an alcohol derived from a renewable source, such as 2-octyl (meth)acrylate.

In some embodiments, the low Tg monomer is the ester of (meth)acrylic acid with an alcohol derived from a renewable source. A suitable technique for determining whether a material is derived from a renewable resource is through $^{14}C$ analysis according to ASTM D6866-10, as described in US2012/0288692. The application of ASTM D6866-10 to derive a "bio-based content" is built on the same concepts as radiocarbon dating, but without use of the age equations. The analysis is performed by deriving a ratio of the amount of organic radiocarbon ($^{14}C$) in an unknown sample to that of a modern reference standard. The ratio is reported as a percentage with the units "pMC" (percent modern carbon).

One suitable monomer derived from a renewable source is 2-octyl (meth)acrylate, as can be prepared by conventional techniques from 2-octanol and (meth)acryloyl derivatives such as esters, acids and acyl halides. The 2-octanol may be prepared by treatment of ricinoleic acid, derived from castor oil, (or ester or acyl halide thereof) with sodium hydroxide, followed by distillation from the co-product sebacic acid. Other (meth)acrylate ester monomers that can be renewable are those derived from ethanol and 2-methyl butanol. In some embodiments, the (e.g. pressure sensitive) adhesive composition (e.g. (meth)acrylic polymer and/or free-radically polymerizable solvent monomer) comprises a bio-based content of at least 25, 30, 35, 40, 45, or 50 wt-% using ASTM D6866-10, method B. In other embodiments, the (e.g. pressure sensitive) adhesive composition comprises a bio-based content of at least 55, 60, 65, 70, 75, or 80 wt-%. In yet other embodiments, the (e.g. pressure sensitive) adhesive composition comprises a bio-based content of at least 85, 90, 95, 96, 97, 99 or 99 wt-%.

The acrylic pressure sensitive adhesive typically comprises at least 50, 55, 60, 65, 70, 75, 80, 85, 90 wt-% or greater of polymerized units of monofunctional alkyl (meth) acrylate monomer having a Tg of less than 0° C., based on the total weight of the polymerized units (i.e. excluding inorganic filler or other additives).

The acrylic pressure sensitive adhesive may further comprise at least one high Tg monomer, i.e. a (meth)acrylate monomer when reacted to form a homopolymer has a Tg greater than 0° C. The high Tg monomer more typically has a Tg greater than 5° C., 10° C., 15° C., 20° C., 25° C., 30° C., 35° C., or 40° C. High Tg monofunctional alkyl (meth)

acrylate monomers including for example, t-butyl acrylate, methyl methacrylate, ethyl methacrylate, isopropyl methacrylate, n-butyl methacrylate, isobutyl methacrylate, s-butyl methacrylate, t-butyl methacrylate, stearyl methacrylate, phenyl methacrylate, cyclohexyl methacrylate, isobornyl acrylate, isobornyl methacrylate, norbornyl (meth)acrylate, benzyl methacrylate, 3,3,5 trimethylcyclohexyl acrylate, cyclohexyl acrylate, N-octyl acrylamide, and propyl methacrylate or combinations.

The acrylic pressure sensitive adhesive may further comprise polymerized units of polar monomers. Representative polar monomers include for example acid-functional monomers (e.g. acrylic acid, methacrylic acid), hydroxyl functional (meth)acrylate) monomers, nitrogen-containing monomers (e.g. acrylamides), and combinations thereof. In some embodiments, the acrylic pressure sensitive adhesive comprises at least 0.5, 1, 2 or 3 wt-% and typically no greater than 10 wt-% of polymerized units of polar monomers, such as acrylamide and/or acid-functional monomers such as (meth)acrylic acid.

The pressure sensitive adhesive may further include one or more suitable additives according to necessity. The additives are exemplified by crosslinking agents (e.g. multifunctional (meth)acrylate crosslinkers (e.g. TMPTA), epoxy crosslinking agents, isocyanate crosslinking agents, melamine crosslinking agents, aziridine crosslinking agents, etc.), tackifiers (e.g., phenol modified terpenes and rosin esters such as glycerol esters of rosin and pentaerythritol esters of rosin, as well as C5 and C9 hydrocarbon tackifiers), thickeners, plasticizers, fillers, antioxidants, ultraviolet absorbers, antistatic agents, surfactants, leveling agents, colorants, flame retardants, and silane coupling agents.

The (e.g. pressure sensitive) adhesive layer may be disposed upon the film by various customary coating methods (e.g. gravure) roller coating, flow coating, dip coating, spin coating, spray coating, knife coating, (e.g. rotary or slit) die coating, (e.g. hot melt) extrusion coating, and printing. The adhesive may be applied directly to the PLA film described herein or transfer coated by use of release liner. When a release liner is used, the adhesive is either coated on the liner and laminated to the film or coated on the film and the release liner subsequently applied to the adhesive layer. The adhesive layer may be applied as a continuous layer, or a patterned, discontinuous layer. The adhesive layer typically has a thickness of about 5 to about 50 micrometers.

In one favored embodiment, an adhesive article is prepared by melt extrusion of at least two layers, i.e. a core film layer and an adhesive layer. The two layers can be sequentially extruded, but are preferably coextruded. In another favored embodiment, an adhesive article is prepared by melt extrusion of at least three layers, i.e. a core film layer, a release film layer, and an adhesive layer. The three layers can be sequentially extruded, but are preferably coextruded. This method may comprise uniaxially or biaxially orienting the film layers as well as heat setting the oriented film layers, as previously described.

The core film layer comprises a composition comprising at least 50% of a polylactic acid polymer, as previously described. The release film layer is extruded on a major surface of the core layer. The adhesive layer extruded on the opposing major surface of the core layer. The adhesive layer comprises moieties that are miscible in the composition of the core layer. The solubility is evident by AFM cross-sectional analysis conducted as further described in the examples. When the adhesive layer comprises moieties that are miscible in the PLA composition of the core film layer, regions of interdiffusion are present between the core film layer and adhesive layer. Although the regions of interdiffusion are not necessarily uniform, such regions are evident. The depth (i.e. thickness) of the regions of interdiffusion in the thickness direction of the core film layer and adhesive layer are typically at least 10 nm. In some embodiments, the depth (i.e. thickness) of the regions of interdiffusion in the thickness direction are at least 25 nm, 50 nm, or 75 nm ranging up to at least 125 nm or greater.

In some embodiments, the adhesive comprises polymerized units of C1-C10 (meth)acrylic acid. Thus, the adhesive comprises an acrylic copolymer. In other embodiments, the adhesive may comprise other polymerized units that are miscible in the PLA, such as polymerized units of vinyl acetate, ethylene vinyl acetate, partially hydrolyzed polyvinyl acetate, and combinations thereof.

The components of the PLA release composition are chosen to provide good release properties. The performance of the composition and film comprising PLA and the release agent can be evaluated by various method. In some embodiments, the release surface of the unoriented or oriented film is evaluated by applying a pressure sensitive adhesive tape to the release surface and then measuring the removal force (i.e. 180 degree Peel Adhesion) as well as readhesion of the tape. Such test methods are described in greater detail in the examples.

The removal force is generally significantly lower than the same PLA film without the release agent. In some embodiments, the 180 degree Peel Adhesion after 72 hours at 23° C. and 50% RH (relative humidity) or after 72 hours at 50° C. is less than 3, 2.5, 2, or 1.5 N/cm. Depending on the application the 180 degree Peel Adhesion after 72 hours can approach zero such as in the case of release liners or in the case of low adhesive backsize may be at least 0.05, 0.1 or 0.5 N/cm when tested with 845 Tape.

The readhesion is indicative of the anchoring of the release agent within the PLA film. The readhesion is typically similar to that of the 180 degree Peel Adhesion. By similar it is meant the average value +/−20% of the average value. For example, if the average 180 degree Peel Adhesion is 3.33 N/cm when tested with 845 tape, the readhesion may range from about 2.5 to 4 N/cm. The readhesion will be significantly lower than the removal force if the pressure sensitive adhesive of the tape removes the release agent while determining the initial removal force. The readhesion can be significantly higher when tested at 50° C. if the adhesive is not sufficiently stable at such temperature.

Another measure of effectiveness of the release characteristic for a given adhesive system is the relative peel factor (RPF) defined here as the measured peel force divided by the subsequently measured re-adhesion force for a given tape/release system. In some embodiments, the relative peel factor is less than 1, 0.9, 0.8, 0.7, 0.6, 0.5, 0.4, or 0.3. Too low of a peel factor can also result in tapes that tend to unwind on their own rolls. Thus, in some embodiments, the relative peel factor is at least 0.1, 0.2, 0.3, or 0.4.

Stretching levels can effect both the 180 degree Peel Adhesion and RPF, and therefore may provide a method for tuning these properties. In some cases, increasing the draw (stretching) ratios with heat setting after stretching can decrease the peel adhesion or increase the re-adhesion or both and also reduce the resulting relative peel factor. In other cases, over-drawing past certain limits may actually start to increase the peel adhesion values relative to lower draw (stretch) ratios and thus also raise the relative peel factor.

When the PLA release composition is a layer of a multilayer (e.g. tape) construction that further comprises a pressure sensitive adhesive layer, the release surface of the unoriented or oriented film can be evaluated by measuring the removal force (i.e. 180 degree Peel Adhesion) as well as readhesion of the tape while unwinding the tape from its own roll.

In some embodiments, the (e.g. oriented) film described herein may be disposed upon or bonded (e.g. with an adhesive) to a backing layer. The backing can comprise a variety of flexible and inflexible (e.g. preformed web) substrates including but not limited to polymeric films, metal foils, foams, paper, and combinations thereof (e.g. metalized polymeric film). Polymeric films include for example polyolefins such as polypropylene (e.g. biaxially oriented), polyethylene (e.g. high density or low density), polyvinyl chloride, polyurethane, polyester (polyethylene terephthalate), polycarbonate, polymethyl(meth)acrylate (PMMA), polyvinylbutyral, polyimide, polyamide, fluoropolymer, cellulose acetate, cellulose triacetate, ethyl cellulose, as well as biobased material such as polylactic acid (PLA).

In another embodiment, the (e.g. oriented) film or backing may further comprise a metal or metal oxide layer. Examples of metals include aluminum, silicon, magnesium, palladium, zinc, tin, nickel, silver, copper, gold, indium, stainless steel, chromium, titanium, and so on. Examples of metal oxides used in the metal oxide layer include aluminum oxide, zinc oxide, antimony oxide, indium oxide, calcium oxide, cadmium oxide, silver oxide, gold oxide, chromium oxide, silicon oxide, cobalt oxide, zirconium oxide, tin oxide, titanium oxide, iron oxide, copper oxide, nickel oxide, platinum oxide, palladium oxide, bismuth oxide, magnesium oxide, manganese oxide, molybdenum oxide, vanadium oxide, barium oxide, and so on. These metals and metal oxides may be used singly or in combination of two or more. Layers of these metals and/or metal oxides can be formed by known methods such as vacuum deposition, ion plating, sputtering, and CVD (Chemical Vapor Deposition). The thickness of the metal and/or metal oxide layer is typically at least 5 nm ranging up to 100 or 250 nm.

The thickness of the backing is typically at least 10, 15, 20, or 25 microns (1 mil) and typically no greater than 500 microns (20 mil) thickness. In some embodiments, the thickness of the backing is no greater than 400, 300, 200, or 100 microns. The backing as well as the overall film is typically in the form of a roll-good, but may also be in the form of individual sheets.

In some embodiments, the second layer (e.g. backing) is a thermoplastic polymer film such as polycarbonate, polyethylene terephthalate, polyamide, polyethylene, polypropylene, polystyrene, polyvinyl chloride, poly(meth)acrylic polymers, ABS (acrylonitrile-butadiene-styrene copolymer) resins, and the like. In some embodiments, the backing or overall film is transparent having a transmission of visible light of at least 90 percent.

In some embodiments, the backing is conformable. By "conformable" it is meant that the film or film layer is sufficiently soft and flexible such that it accommodates curves, depressions, or projections on a substrate surface so that the film may be stretched around curves or projections, or may be pressed down into depressions without breaking or delaminating the film. It is also desirable that the film does not delaminate or release from the substrate surface after application (known as popping-up).

Suitable conformable backing layers include, for example, polyvinyl chloride (PVC), plasticized polyvinyl chloride, polyurethane, polyethylene, polypropylene, fluoropolymer or the like. Other polymer blends are also potentially suitable, including for example thermoplastic polyurethane and a cellulose ester.

Definitions of Terms to be Used in the Examples

Films were cast and wound along the machine direction (MD), also called the "x" direction. Films were stretched along MD to a machine direction draw ratio (MDDR) and/or stretched along the transverse direction (TD), also called the "y" direction, to a transverse direction draw ratio (TDDR). The thickness direction is also referred to as the "z" direction. These directions are approximately the principal directions for stretching, and for properties (such as refractive indices) for samples taken from the middle of a stretched part. These directions thus also define a Cartesian coordinate system for the samples.

Release Testing of Exemplary Film Examples and Comparative Examples

Each specimen was prepared for release testing by attaching a laminate of a testing tape to the experimental release film using a 2 kg calibrated weighted rubber roller for application. To reduce testing variability in a given test set, laminates used testing tape taken from the same roll of tape, which were applied to both the release specimens as well as the control samples. The testing tape was applied to the release side of the specimen. Next, this assembly was conditioned at a fixed environmental condition (either 23° C. and constant humidity of 50% RH, or 50° C. at low but uncontrolled humidity) for a set time of either 1 hour, 3 days, or 7 days. Then the other side of the specimen was laminated to the glass panel, using the roller, via a double coated adhesive tape (3M™ Double Coated Paper Tape 410M). Conditions for each test are given in the Tables B and C, or in the descriptions of the Examples. Finally, the laminated adhesive tape was peeled from the experimental release liner at 180° at a rate of 2.3 meters/minute (90 inches/minute). All peel tests were done in a facility at constant temperature (23° C.) and constant humidity (50% RH). To determine re-adhesion value, the peeled adhesive tape was applied to the surface of a clean glass plate by means of a 2 kg rubber roller. (The glass was cleaned before and between tests by wiping with heptane, IPA, and MEK solvents.) The re-adhesion value was a measure of the force required to pull the tape from the glass surface at an angle of 180° and a rate of 2.3 meters/minute (90 inches/minute). The peel tester used was an IMASS slip/peel tester (model 3M90 or model TL-2300, commercially available from Instrumentors Inc., Strongville, Ohio). Two or three samples of each condition were tested; the reported results are an average of the values from each of the two or three samples. Measurements are presented in units of N/cm. Results for the various examples are provided in the text and/or in Table B using Scotch™ Book Tape 845 available from 3M Company, St. Paul, MN USA (henceforth referred to simply as "845" tape), Table C using 810 Magic™ Tape available from 3M Company, St. Paul, MN USA (henceforth referred to simply as "810" tape) and Scotch™ High Performance Masking Tape 232 available from 3M Company, St. Paul, MN USA (henceforth referred to simply as "232" tape).

EXAMPLES

Materials as used in the synthesis of the release materials are identified in Table A.

TABLE A

| Designator | Name | Availability |
|---|---|---|
| VAZO 52 | 2,2'-azobis(2,4 dimethylpentanenitrile) | Dupont, Wilmington, DE |
| VAZO 88 | 2,2'-azobis(cyclohexanecarbonitrile) | Dupont, Wilmington, DE |
| IRGANOX 1010 | tetrakis(methylene(3,5-di-tert-butyl-4-hydroxyhydrocinnamate))methane | BASF, Vandalia, IL |
| LUPERSOL 101 | 2,5-dimethyl-2,5 Di-(t-butylperoxy)hexane | Elf Atochem, Philadelphia, PA |
| LUPERSOL 130 | 2,5-dimethyl-2,5-Di-(t-butylperoxy)hexyne-3 | Sigma Aldrich, St. Louis, MO |
| MMA | Methyl methacrylate | Rohm and Haas, Philadelphia, PA |
|  | Ethyl acetate | Honeywell, Muskagee, MI |
| ODA | Octadecyl acrylate | San Esters Corporation, New York, NY |
| IOTG | Isooctylthioglycolate | Evans Chemetics LP, Teaneck, NJ |
| MEHQ | 4-methoxyphenol | Sigma-Aldrich, St. Louis, MO |

Release Material 1 (R1)

R1 is a copolymer comprised of approximately 40 wt % octadecyl acrylate (ODA) and approximately 60 wt % methyl methacrylate (MMA).

The ODA was pre-weighed and melted in an oven. To this warm mixture, MMA was added and the contents (approximately 600 g) were charged into an adiabatic reactor. To this mixture, the following materials were added: 1.4875 pph of IOTG; 0.1 pph of Irganox 1010; 0.02 pph of MEHQ; 0.057 pph of Vazo 52; 0.057 pph of Vazo 88; 0.0068 pph of Lupersol 101; and 0.0091 pph of Lupersol 130. The reactor was sealed and purged of oxygen and then held at approximately 5 psig of nitrogen pressure. The mixture was heated to approximately 60° C. and the reaction proceeded adiabatically. The reaction was allowed to exotherm to approximately 104° C., at which point the reaction was heated to 150° C. and held for 10 minutes. The reaction was allowed to cool to 50° C. An aliquot was removed from the reactor and the conversion was measured by FTIR.

To the reaction product, 0.67 g of IOTG was added along with 0.7 g of a solution of 0.1 pph Vazo 52, 0.1 pph Vazo 88, 0.012 pph Lupersol 101, and 0.016 pph Lupersol 130 in ethyl acetate. The reactor was then sealed and purged of oxygen and held at approximately 5 psig of nitrogen pressure. The mixture was heated to 150° C. over a 30 minute time period.

Release Material 2 (R2)

R2 is a copolymer comprised of approximately 60 wt % octadecyl acrylate (ODA) and 40 wt % methyl methacrylate (MMA).

The ODA was pre-weighed and melted in an oven. To this warm mixture, MMA was added and the contents (approximately 600 g) were charged into an adiabatic reactor. To this mixture, the following materials were added: 1.935 pph of IOTG; 0.1 pph of Irganox 1010; 0.02 pph of MEHQ; 0.029 pph of Vazo 52; 0.029 pph of Vazo 88; 0.0068 pph of Lupersol 101; and 0.0091 pph of Lupersol 130. The reactor was sealed and purged of oxygen and then held at approximately 5 psig of nitrogen pressure. The mixture was heated to approximately 60° C. and the reaction proceeded adiabatically. The reaction was allowed to exotherm to approximately 103° C., at which point the reaction was heated to 150° C. and held for 15 minutes. The reaction was allowed to cool to 50° C. An aliquot was removed from the reactor and the conversion was measured by FTIR.

To the reaction product, 1.16 g of IOTG was added along with 4.2 g of a solution of 0.05 pph Vazo 52, 0.05 pph Vazo 88, 0.012 pph Lupersol 101, and 0.016 pph Lupersol 130 in ethyl acetate. The reactor was then sealed and purged of oxygen and held at approximately 5 psig of nitrogen pressure. The mixture was heated to 150° C. over a 30 minute time period and then held at 150° C. for 70 minutes.

Example Film 1 (F1)

F1 was a two-layer co-extruded film comprising a release layer and a substrate layer in a weight ratio of 1:9. The substrate layer was made from pure PLA resin (INGEO BIOPOLYMER 4032D, from NatureWorks LLC, Minnetonka, MN) fed into two of the three layers of a three-layer feedblock (Cloeren, Inc., Orange, TX). The PLA resin was dried prior to use at 70° C. for at least 8 hours. The release layer was fed to the third layer of the feedblock and was made by feeding 3 wt. % Release Material 1 into the cooled extruder throat along with the PLA resin 4032D (i.e. at 97 wt. %). The final extruder zones were set at 205° C. for the release layer and subsequent melt train components, including the 3-layer feedblock and the die, were set at 200° C. At this temperature, no apparent discoloration from degradation was observed. The film was cast into a nip with the release side against a chrome chill wheel. The cast film was approximately 5.6 mils (140 microns) thick.

Using 845 tape, Film F1 was tested for its release ability and quality of anchoring of the release to the substrate as reported in Table B.

Example Film 2 (F2)

Oriented film F2 was made by stretching the cast film F1 using a KARO IV Laboratory Biaxial Stretching Device, available from Brueckner (Portsmouth, NH). The film was pre-heated for 120 seconds, at 85° C., and then biaxially stretched simultaneously at this same temperature, to a nominal final draw ratio (stretch ratio) of 3×3 in both in-plane directions, at constant speed, with initial rate of 100%/sec. The film was then subsequently heat set for an additional 20 seconds at 155° C. The refractive indices (at 632.8 nm) of both sides of the film were measured using a Prism Coupler model 2010/M (available from Metricon, Piscataway NJ). The refractive indices were thus found as 1.455, 1.461 and 1.445 (in the two in-plane and thickness principal directions of draw, respectively) on the release side, and 1.454, 1.461 and 1.444 (in the two in-plane and thickness principal directions of draw, respectively) on the PLA side. Thus, the PLA was well oriented and had a total birefringence of 0.026.

Using 845 tape, Film F2 was tested for its release ability and quality of anchoring of the release to the substrate as reported in Table B.

Example Film 3 (F3)

F3 was a co-extruded multilayer film comprising a release layer and a substrate layer in a ratio of 1:9. The substrate layer was made from pure PLA resin (INGEO BIOPOLYMER 4032D, from NatureWorks LLC, Minnetonka, MN) fed into two of the three layers of a three-layer feedblock (Cloeren, Inc., Orange, TX). The PLA resin was dried prior to use at 70° C. for at least 8 hours. The release layer was fed to the third layer of the feedblock and was made by feeding 10 wt. % Release Material 1 into the cooled extruder throat along with the PLA resin 4032D (i.e. at 90 wt. %). The final extruder zones were set at 205° C. for the release layer and subsequent melt train components, including the 3-layer feedblock and the die, were set at 200° C. At this temperature, no apparent discoloration from degradation was observed. The film was cast into a nip with the release side against a chrome chill wheel. The cast film was approximately 5.1 mils (130 microns) thick.

Using 845 tape, Film F3 was tested for its release ability and quality of anchoring of the release to the substrate as reported in Table B.

Example Film 4 (F4)

Oriented film F4 was made by stretching the cast film F3 using a KARO IV Laboratory Biaxial Stretching Device, available from Brueckner (Portsmouth, NH). The film was pre-heated for 120 seconds, at 85° C., and then biaxially stretched simultaneously at this same temperature, to a nominal final draw ratio (stretch ratio) of 3×3 in both in-plane directions, at constant speed, with initial rate of 100%/sec. The film was then subsequently heat set for an additional 20 seconds at 155° C. The refractive indices (at 632.8 nm) of both sides of the film were measured using a Prism Coupler model 2010/M (available from Metricon, Piscataway NJ). The refractive indices were thus found as 1.459, 1.459 and 1.444 (in the two in-plane and thickness principal directions of draw, respectively) on the release side, and 1.458, 1.457 and 1.444 (in the two in-plane and thickness principal directions of draw, respectively) on the PLA side. Thus, the PLA was well oriented and had a total birefringence of 0.030.

Using 845 tape, Film F4 was tested for its release ability and quality of anchoring of the release to the substrate as reported in Table B.

Example Film 5 (F5)

F5 (also hereinafter referred to as "Tape 1") was a co-extruded multilayer film comprising a release layer on one side and an adjacent core substrate layer with an adhesive on its second side (opposite the release) in a weight ratio of 1:8:1. The substrate layer was made from pure PLA resin (INGEO BIOPOLYMER 4032D, from NatureWorks LLC, Minnetonka, MN) fed into the center layer of the three layers of a three-layer feedblock (Cloeren, Inc., Orange, TX). The PLA resin was dried prior to use at 70° C. for at least 8 hours. The release layer was fed to an outer layer of the feedblock and was made by feeding 10 wt. % Release Material 2 into the cooled extruder throat along with the PLA resin 4032D (i.e. at 90 wt. %). The adhesive, which was fed to the remaining layer of the feedblock, was a co-polymer comprising 2-ethylhexyl acrylate and acrylic acid in the relative proportions of 19:1. The adhesive also comprised 0.15 wt. % acryloxybenzophenone which is a UV-activated photo-crosslinker. The final extruder zones were set at 205° C. for the release layer and subsequent melt train components, including the 3-layer feedblock and the die, were set at 200° C. At this temperature, no apparent discoloration from degradation was observed. The film was cast into a nip with the release side against a chrome chill wheel. The cast film was approximately 10.3 mils (260 microns) thick.

Using 845 tape, Film F5 was tested for its release ability and quality of anchoring of the release to the substrate as reported in Table B.

Two-bond adhesion was qualitatively measured by pressing the adhesive against a sheet of plain white paper. The tape delaminated the paper upon removal while remaining intact itself.

A vertical strip of Tape 1 was clipped to hang freely in an oven set at 50° C. for 72 hours. The tape was slightly curled away from the adhesive side (e.g. towards the release side) due to an initial roll curl set into the tape during casting and quenching. The tape retained its initial curl, indicating no apparent residual orientation nor shrinkage of the adhesive at this condition.

Due to its composition, it would be possible to UV-cure Tape 1 after film processing to optimize adhesive shear strength versus tack.

Phase imaging, an auxilliary technique of Tapping Mode Atomic Force Microscopy, was used to image a cross-sectioned sample of Example F5 ("Tape 1"). Sample preparation consisted of embedding the sample in epoxy and curing overnight. The embedded sample was then microtomed at cryogenic temperatures to generate a cross-sectioned surface for AFM analysis. Phase imaging was performed on interfacial regions between the adhesive and PLA substrate layers. The AFM instrument used to collect the data is a Veeco Dimension D3100 AFM system with an OTESPA probe (both available from Veeco Instruments, Inc., Plainview, NY). In AFM phase images, darker areas typically correspond to a material with lower stiffness while brighter areas correspond to a material with higher stiffness. In this example tape, the adhesive layer appeared as a dark band whereas the PLA substrate layer appeared as a much lighter band. In between these regions of marked contrast difference, an additional band of intermediate contrast was observed indicating a region of interdiffusion between the miscible adhesive and the PLA substrate. This intermediate region was variable in extent depending on the crossweb and downweb position of the tape. Extensive interdiffusion of at least 75 nm, and in other places more than 125 nm, were found in several locations.

Example Film 6 (F6)

Oriented film F6 (also hereinafter referred to as "Tape 2") was made by stretching the cast film F5 using a KARO IV Laboratory Biaxial Stretching Device, available from Brueckner (Portsmouth, NH). The film was pre-heated for 120 seconds, at 85° C., and then biaxially stretched simultaneously at this same temperature, to a nominal final draw ratio (stretch ratio) of 3×3 in both in-plane directions, at constant speed, with initial rate of 100%/sec. The film was then subsequently heat set for an additional 20 seconds at 155° C. The resulting oriented film was about 30 microns thick. The refractive indices (at 632.8 nm) of both sides of the film were measured using a Prism Coupler model 2010/M (available from Metricon, Piscataway NJ). The refractive indices were thus found as 1.463, 1.459 and 1.445 (in the two in-plane and thickness principal directions of draw, respectively) on the release side, and 1.470, 1.470 and 1.470 (in the two in-plane and thickness principal directions of draw, respectively) on the adhesive side. Thus, the PLA was well oriented and had a total birefringence of 0.032.

Using 845 tape, Film F6 was tested for its release ability and quality of anchoring of the release to the substrate as reported in Table B.

Two-bond adhesion was qualitatively measured by pressing the adhesive against a sheet of plain white paper. The tape delaminated the paper upon removal while remaining intact itself.

Due to its composition, it would be possible to UV-cure Tape 2 after film processing to optimize adhesive shear strength versus tack.

Example Film 7 (F7)

Oriented film F7 (also hereinafter referred to as "Tape 3") was made by stretching the cast film F5 using a KARO IV Laboratory Biaxial Stretching Device, available from Brueckner (Portsmouth, NH). The film was stretched so as to imitate a uniaxial stretch on production scale equipment. Because of the lack of fully supported edges in the batch stretcher, a film stretched only in one direction will pull in slightly in the physically non-drawn in-plane direction. In order to simulate a uniaxially stretched film as one might accomplish within a continuously transversely stretching tenter, the actual stretch profile was chosen to maintain a final draw ratio in the "non-drawn" in-plane direction near a value of unity. Thus, the film was pre-heated for 120 seconds, at 85° C., and then biaxially stretched simultaneously at this same temperature, to a nominal final draw ratio (stretch ratio) of 1.29×4.5 in the two in-plane directions, at constant speed, with initial rate of 100%/sec for the uniaxial (e.g. 4.5× nominal) stretch direction and concomitantly much lower rate for the weakly drawn direction. The film was then subsequently heat set for an additional 20 seconds at 155° C. The resulting oriented film had true measured draw ratio (as indicated by fiducial lines applied to cast film with a permanent marker) of 1.0×4.4. The film was about 60 microns thick. The refractive indices (at 632.8 nm) of both sides of the film were measured using a Prism Coupler model 2010/M (available from Metricon, Piscataway NJ). The refractive indices were thus found as 1.469, 1.449 and 1.447 in the draw direction, the in-plane non-drawn direction and thickness direction, respectively) on the release side, and 1.470, 1.470 and 1.470 (in the draw direction, the in-plane non-drawn direction and thickness direction, respectively) on the adhesive side. Thus, the PLA was well oriented and had a total birefringence of 0.024.

Using 845 tape, Film F7 was tested for its release ability and quality of anchoring of the release to the substrate as reported in Table B.

Tape 3 showed good hand tearability along the 4.4× true draw direction. The tear was very straight and neatly separated. The film was tough and prevented hand tearing along the essentially undrawn in-plane direction.

Similar results are anticipated for a tenter stretched film, resulting in hand tearability along the transverse direction (TD) while resisting tearing along the machine direction (MD) of conveyance and winding, e.g. into a roll of film. Thus a wound roll of hand-tearable PLA-based film with release properties on at least one side is also anticipated with this invention.

Two-bond adhesion was qualitatively measured by pressing the adhesive against a sheet of plain white paper. The tape delaminated the paper upon removal while remaining intact itself.

A vertical strip of Tape 3 was clipped to hang freely in an oven set at 50° C. for 72 hours. The tape remained flat without any curl indicating no apparent residual orientation nor shrinkage of the adhesive at this condition.

Due to its composition, it would be possible to UV-cure Tape 3 after film processing to optimize adhesive shear strength versus tack.

Example Film 8 (F8)

F8 (also hereinafter referred to as "Tape 4") was a co-extruded multilayer film comprising a release layer on one side and an adjacent core substrate layer with an adhesive on its second side (opposite the release) in a weight ratio of 1:8:1. The substrate layer was made from pure PLA resin (INGEO BIOPOLYMER 4032D, from NatureWorks LLC, Minnetonka, MN) fed into the center layer of the three layers of a three-layer feedblock (Cloeren, Inc., Orange, TX). The PLA resin was dried prior to use at 70° C. for at least 8 hours. The release layer was fed to an outer layer of the feedblock and was made by feeding 10 wt. % Release Material 1 into an extruder stream otherwise comprising PLA resin 4032D (i.e. at 90 wt. %). The adhesive, which was fed to the remaining layer of the feedblock, was a co-polymer comprising 2-ethylhexyl acrylate and acrylic acid in the relative proportions of 19:1. The adhesive also comprised 0.15 wt. % acryloxybenzophenone which is a UV-activated photo-crosslinker. The final extruder zones and subsequent melt train components, including the 3-layer feedblock and the die, were set at 200° C. At this temperature, no apparent discoloration from degradation was observed. The film was cast into a nip with the release side against a chrome chill wheel. The cast film was approximately 14.2 mils (360 microns) thick.

Two-bond adhesion was qualitatively measured by pressing the adhesive against a sheet of plain white paper. The tape delaminated the paper upon removal while remaining intact itself.

A vertical strip of Tape 4 was clipped to hang freely in an oven set at 50° C. for 72 hours. The tape was slightly curled away from the adhesive side (e.g. towards the release side) due to an initial roll curl set into the tape during casting and quenching. The tape retained its initial curl, indicating no apparent residual orientation nor shrinkage of the adhesive at this condition.

Due to its composition, it would be possible to UV-cure Tape 4 after film processing to optimize adhesive shear strength versus tack.

Example Film 9 (F9)

Oriented film F9 (also hereinafter referred to as "Tape 5") was made by stretching the cast film F8 using a KARO IV Laboratory Biaxial Stretching Device, available from Brueckner (Portsmouth, NH). The film was pre-heated for 120 seconds, at 85° C., and then biaxially stretched simultaneously at this same temperature, to a nominal final draw ratio (stretch ratio) of 3×3 in both in-plane directions, at constant speed, with initial rate of 100%/sec. The film was not heat set. The resulting oriented film was approximately 30 microns thick. The refractive indices (at 632.8 nm) of both sides of the film were measured using a Prism Coupler model 2010/M (available from Metricon, Piscataway NJ). The refractive indices were thus found as 1.457, 1.453 and 1.444 (in the two in-plane and thickness principal directions of draw, respectively) on the release side, and 1.470, 1.470 and 1.470 (in the two in-plane and thickness principal directions of draw, respectively) on the adhesive side. Thus, the PLA was well oriented and had a total birefringence of 0.022.

Two-bond adhesion was qualitatively measured by pressing the adhesive against a sheet of plain white paper. The tape delaminated the paper upon removal while remaining intact itself.

Due to its composition, it would be possible to UV-cure Tape 5 after film processing to optimize adhesive shear strength versus tack.

Example Film 10 (F10)

F10 was a two-layer co-extruded film comprising a release layer and a substrate layer in a weight ratio of 3:5. The substrate layer was made from pure PLA resin (INGEO BIOPOLYMER 4032D, from NatureWorks LLC, Minnetonka, MN) fed into two of the three layers of a three-layer feedblock (Cloeren, Inc., Orange, TX). The PLA resin was dried prior to use at 65° C. for at least 8 hours. The release layer was fed to the third layer of the feedblock and was made by feeding 7.5 wt. % PEELOIL 1010s (available from Lion Specialty Chemicals Co., Ltd., Tokyo, Japan), a long chain-alkyl pendant polymer, into an extruder stream otherwise comprising PLA resin 4032D (i.e. at 92.5 wt. %). The final extruder zones and subsequent melt train components, including the 3-layer feedblock and the die, were set at 200° C. At this temperature, no apparent discoloration from degradation was observed. The film was cast using electrostatic pinning onto a chrome chill wheel so that the release layer formed the airside of the film and the pure PLA side was cast against the wheel. The cast film was approximately 5.2 mils (130 microns) thick.

Using 845 tape, Film F10 was tested for its release ability and quality of anchoring of the release to the substrate as reported in Table B.

Analogous tests to those whose results are shown in Table B were also performed on F10 using an alternative tape, "810" (3M, St. Paul, MN). Using the 810 tape, the Peel Adhesion and Re-Adhesion at an elevated temperature of 50° C. after a 1-day dwell were found to be 9.7 oz/in (1.1 N/cm) and 21.4 oz/in (2.3 N/cm), respectively; and thus, also exhibited a relative peel factor of 0.45.

Example Film 11 (F11)

Oriented film F11 was made by stretching the cast film F10 in a continuous film-making process. The cast web was conveyed into a length orienter, preheated to initial temperature of over 63° C. and stretched to a Machine Direction (MD) draw ratio of 1.15. The film was then conveyed into a conventional tenter, preheated to 86° C. and drawn transversely to a nominal and measured Transverse Direction (TD) draw ratio of 4.0. The film was heat set at 157° C., slit and wound into a roll of film.

The resulting film was approximately 1.1 mils (30 microns) thick. Refractive indices in MD, TD and z (thickness direction) were measured at 632.8 nm to be 1.445, 1.467 and 1.443 respectively and had a total birefringence of 0.026. Film 11 was hand-tearable along the TD direction, but was tear resistant along the MD direction, providing an anti-slivering property.

Film F11 was tested for its release ability and quality of anchoring of the release to the substrate as reported in Table B.

Analogous tests to those whose results are shown in Table B were also performed on F11 using an alternative tape, "810" (3M, St. Paul, MN). Using the 810 tape, the peel and re-adhesion at room temperature (25° C.) after a 3-day dwell were found to be 5.9 oz/in (0.6 N/cm) and 23.4 oz/in (2.6 N/cm), respectively, and thus the relative peel factor was 0.25. The Peel Adhesion and Re-Adhesion at an elevated temperature of 50° C. after a 3-day dwell were found to 8.9 oz/in (1.0 N/cm) and 20.6 oz/in (2.3 N/cm), respectively; and thus, the relative peel factor was 0.43. Using this 810 tape, the Peel Adhesion and Re-Adhesion at an elevated temperature of 60° C. after a 1-day dwell were found to be 7.9 oz/in (0.9 N/cm) and 22.7 oz/in (2.5 N/cm), respectively; and thus, the relative peel factor was 0.35. Thus also, this nearly uniaxially stretched (asymmetrically biaxially stretched) film had lower peel, higher re-adhesion and lower relative peel factor than the corresponding cast film (F10).

Example Film 12 (F12)

Oriented film F12 was made by stretching the cast film F10 using a KARO IV Laboratory Biaxial Stretching Device, available from Brueckner (Portsmouth, NH). The film was pre-heated for 120 seconds, at 85° C., and then biaxially stretched simultaneously at this same temperature, to a nominal final draw ratio (stretch ratio) of 3×3 in both in-plane directions, at constant speed, with initial rate of 100%/sec. The film was then subsequently heat set for an additional 20 seconds at 155° C.

Using 845 tape, Film F12 was tested for its release ability and quality of anchoring of the release to the substrate as reported in Table B.

Analogous tests to those whose results are shown in Table B were also performed on F12 using an alternative tape, "810" (3M, St. Paul, MN). Using the 810 tape, at room temperature (25° C.) after a 1-hour dwell were found to be 6.8 oz/inch (0.7 N/cm) and 30.6 oz/inch (3.3 N/cm), respectively; and thus the relative peel factor was 0.22. The Peel Adhesion and Re-Adhesion at an elevated temperature of 50° C. after a 3-day dwell were found to be 5.2 oz/inch (0.6 N/cm) and 20.8 oz/inch (2.3 N/cm), respectively, and thus the relative peel factor was 0.25. Thus also, this biaxially stretched film had lower peel, higher re-adhesion and lower relative peel factor than the corresponding cast film (F10). Moreover, the peel adhesion and relative peel factor were lower than the oriented film F11, suggesting that in some cases higher levels of stretching may further decrease peel adhesion and relative peel factors.

Additional Examples of Films

Analogous Examples to Films 5 through 9 can be made by replacing the release layer composition during co-extrusion with that of Film Example 10 resulting in co-extruded tapes.

Comparative Example 1 (C1)

This example was a commercial tape, Scotch™ Book Tape 845, available from 3M Company, St. Paul, MN.

Comparative Example 2 (C2)

This Comparative Example was a biaxially oriented PLA Oriented film $C_2$ was made by stretching a cast monolithic film of pure PLA resin (INGEO BIOPOLYMER 4032D, from NatureWorks LLC, Minnetonka, MN) using a KARO IV Laboratory Biaxial Stretching Device, available from Brueckner (Portsmouth, NH). The film was pre-heated for 120 seconds, at 85° C., and then biaxially stretched simultaneously at this same temperature, to a nominal final draw ratio (stretch ratio) of 3×3 in both in-plane directions, at constant speed, with initial rate of 100%/sec. The film was then subsequently heat set for an additional 20 seconds at 155° C. The resulting oriented film was about 30 microns thick.

TABLE B-1

Test Conditions 23° C., 50% RH - 72 or 1 hour Dwell

| Film | 180° Peel Adhesion after 72 Hour (N/cm) | 180° Re-adhesion after 72 Hour (N/cm) | Relative Peel Factor after 72 Hour | 180° Peel Adhesion after 1 Hour (N/cm) | 180° Re-adhesion after 1 Hour (N/cm) | Relative Peel Factor after 1 Hour |
|---|---|---|---|---|---|---|
| F1 | | | | 3.09 | 2.54 | 1.22 |
| F2 | 3.20 | 2.74 | 1.17 | | | |
| F3 | | | | 3.21 | 2.69 | 1.19 |
| F4 | 3.28 | 2.40 | 1.37 | | | |
| F5 | 1.80 | 3.00 | 0.59 | | | |
| F6 | 1.08 | 2.71 | 0.40 | | | |
| F7 | 1.60 | 3.10 | 0.52 | | | |
| F10 | 1.05 | 2.90 | 0.36 | 1.06 | 2.60 | 0.41 |
| F11 | 1.15 | 3.48 | 0.33 | 0.89 | | |
| F12 | 1.06 | 3.28 | 0.32 | | | |
| C1 | 1.02 | 3.20 | 0.32 | 1.06 | 2.93 | 0.36 |
| C2 | 3.33 | 2.83 | 1.17 | | | |
| C3 | 1.10 | 3.50 | 0.48 | | | |

TABLE B-2

Test Conditions 50° C. - 72 hour Dwell

| Film | 180° Peel Adhesion (N/cm) | 180° Re-adhesion (N/cm) | Relative Peel Factor |
|---|---|---|---|
| F1 | | Not Tested | |
| F2 | 3.11 | 2.62 | 1.19 |
| F3 | | Not Tested | |
| F4 | 3.14 | 2.75 | 1.14 |
| F5 | 3.10 | 2.90 | 1.07 |
| F6 | 2.05 | 2.66 | 0.77 |
| F7 | 2.78 | 2.36 | 1.18 |
| F10 | 1.15 | 2.85 | 0.40 |
| F11 | 1.13 | 3.06 | 0.37 |
| F12 | | Not Tested | |
| C1 | 0.71 | 4.15 | 0.17 |
| C2 | 2.99 | 2.94 | 1.01 |
| C3 | 3.10 | 2.60 | 1.19 |

As indicated by Table B-1 and B2, the peel adhesion results for several of the release surfaces were lower than the PLA film without release agent (e.g. Examples F6, F7, F11 and F12 vs. Comparative Example C2). In some cases, the peel re-adhesion results were higher and the relative peel factors were lower for the oriented film relative to the cast film (e.g. Examples F11 and F12 versus cast Example F10). The peel adhesion results for the biaxially oriented film compared favorably to the "845" tape peeled from "845" tape (see Example F6 vs. C1) at 23° C. and 50% R.H. The heatset process is important for anchoring of the release layer as demonstrated by the lack of testable results in the non-heatset biaxially oriented film (see Example F3 vs. F4). In some instances, the peel adhesion results for the biaxially oriented film also showed improved results over a solvent coated release layer (see Example F6 vs. C3 of Table C).

Comparative Examples—Solvent Coating of Release Materials 1 and 2 on PET

The 60/40 and 40/60 ODA/MMA copolymer release agents (Release Materials R2 and R1, respectively) were dissolved separately in 50/50 toluene/ethyl acetate at 5%. The solutions were coated onto the primed side of 2SAB PET film from Mitsubishi Polyester Film, Greer, SC, using a #5 coating rod. The coatings were dried for 2 minutes at 120° C. in an oven. The coated films were placed into a controlled environment at 23° C. and 50% relative humidity for one day prior to release and readhesion testing in the same manner as previously described. The adhesion of the three test tapes, unwound directly from the roll, were also measured to obtain the control values from which the % readhesion values were calculated.

The measured release and readhesion forces, in addition to the % readhesion, are given in Table C. This data is considered to be typical release and readhesion values for these release materials.

TABLE C

| Release Composition | Test Tape | Release Force (N/cm) | | Readhesion Force (N/cm) | | % Readhesion | |
|---|---|---|---|---|---|---|---|
| | | 7 day CTH | 7 day 50° C. | 7 day CTH | 7 day 50° C. | 7 day CTH | 7 day 50° C. |
| 60/40 ODA/MMA | 810 | 0.5 | 5.6 | 2.1 | 2.1 | 105% | 105% |
| Comparative Example C3 | 845 | 1.1 | 3.5 | 3.1 | 2.6 | 94% | 79% |
| | 232 | 1.8 | 4.8 | 4.5 | 3.6 | 105% | 84% |
| 40/60 ODA/MMA | 810 | 1.8 | 3.7 | 2.2 | 2.8 | 110% | 140% |
| | 845 | 2.4 | 2.9 | 2.9 | 2.8 | 88% | 85% |
| | 232 | 3.8 | 4.9 | 3.7 | 3.8 | 86% | 88% |
| Control adhesions | 810 = 2.0 N/cm, 845 = 3.3 N/cm, 232 = 4.3 N/cm | | | | | | |

Cast Film Examples (F13-F18)

Examples Films F13-F18 represent various cast films of various compositions of PLA (Ingeo™ 4032D, available from NatureWorks LLC, Minnetonka, MN), PVAc (Vinnapas™, UW2FS, available from Wacker Chemie AG, Muenchen, Germany), the plasticizer Hallgreen™ R-8010 (available from Hallstar, Chicago, IL) abbreviated as "HG" in Table D, and PEELOIL™ 1010 s (available from Lion Specialty Chemicals Co., Ltd., Tokyo, Japan), a long chain-alkyl pendant polymer abbreviated as "PO" in Table D. Compositions of the various films F14-19 are presented as weight percents of material fed in Table D.

These materials were extruded using a 25 mm twin screw extruder (e.g. available from KraussMaffei Berstorff GmbH, Hannover, Germany) by feeding the PLA and PVAc resin pellets into the extruder throat at a fixed massed flow rate using two gravimetric feeders. The PLA resin was dried prior to use at 65° C. for at least 8 hours. PeelOil was fed by a calibrated powder feeder (e.g a DDSR-12 available from C. W. Brabender Instruments, South Hackensack, NJ, USA). The throat was cooled to 90° C. The plasticizer Hallgreen™ was also fed into the throat using a calibrated heated pump (e.g. a Dynamelt™ S series Adhesive Supply Unit as available from ITW Dynatec, Hendersonville, TN, USA). The temperature was monotonically increased along the extruder barrel to a final zone temperature of 190° C. The melt was conveyed through the melt train and die, also set to 190° C., and finally cast onto a nipped chill roll set at 55° C. All cast webs were thus cast to a final thickness of approximately 250 microns.

Release was evident on both sides of the cast films. As no trend was observed, average peel force from boths sides were taken on samples prepared according to the release testing method described herein, using a 3-day 50° C. conditioning for two different tapes, "810" tape and "845" tape. The results are presented in Table D.

| Film Example ID | Composition (wt %) | | | | Peel Force "810" Tape oz/in | Peel Force "810" Tape N/cm | Peel Force "845" Tape oz/in | Peel Force "845" Tape N/cm |
|---|---|---|---|---|---|---|---|---|
| | PLA | PVAc | HG | PO | | | | |
| F13 | 87.0% | 0.0% | 8.0% | 5.0% | 12.1 | 1.32 | 11.1 | 1.21 |
| F14 | 84.5% | 0.0% | 8.0% | 7.5% | 4.4 | 0.48 | 5.7 | 0.62 |
| F15 | 79.0% | 16.0% | 0.0% | 5.0% | 10.8 | 1.17 | 15.5 | 1.68 |
| F16 | 79.0% | 13.5% | 0.0% | 7.5% | 6.1 | 0.66 | 8.2 | 0.89 |
| F17 | 74.0% | 13.0% | 8.0% | 5.0% | 4.5 | 0.49 | 6.5 | 0.71 |
| F18 | 74.0% | 11.5% | 7.0% | 7.5% | 7.2 | 0.78 | 9.8 | 1.07 |

Cast and Oriented Film Examples (F19-F20)

Examples Films F19 is a two-layer cast film and F20 is a stretched and oriented film derived from the cast F19. One side is thus the "release" layer and the other is the "substrate" layer. The substrate layer comprises a baseline mixture, henceforth referred to as "mixture A" of 74 wt. % of PLA (Ingeo™ 4032D, available from NatureWorks LLC, Minnetonka, MN), 16 wt. % of PVAc (Vinnapas™, UW2FS, available from Wacker Chemie AG, Muenchen, Germany) and 10% of the plasticizer Hallgreen™ R-8010 (available from Hallstar, Chicago, IL).

The release layer uses the same materials used in the substrate layer plus a release material, in this example, PEELOIL™ 1010 s (available from Lion Specialty Chemicals Co., Ltd., Tokyo, Japan), a long chain-alkyl pendant polymer. For films F19 and F20, the release layer comprises 74 weight % PLA, 14.2 weight % PVAc, 8.3 weight % of the plasticizer and 3.5 weight % of release material.

These materials were extruded using two twin screw extruders (e.g. available from KraussMaffei Berstorff GmbH, Hannover, Germany) by feeding the PLA and PVAc resin pellets into the extruder throat at a fixed massed flow rate using two gravimetric feeders. The PLA resin was dried prior to use at 65° C. for at least 8 hours. For the release layer, the PeelOil was fed by a calibrated powder feeder (e.g a DDSR-12 available from C. W. Brabender Instruments, South Hackensack, NJ, USA). The throat was cooled to 90° C. The plasticizer Hallgreen™ was injected into an extruder barrel mixing zone using a calibrated heated pump (e.g. a Dynamelt S series Adhesive Supply Unit as available from ITW Dynatec, Hendersonville, TN, USA). The temperature was monotonically increased along the extruder barrel to a final zone temperature of 190° C. The melt was conveyed through the melt train and die, also set to 190° C., and finally cast with electrostatic pinning onto a chrome-plated casting wheel cooled to 27° C. All cast webs were thus cast to a final thickness of approximately 250 microns.

The cast film F19 was conveyed directly into a conventional tenter, preheated to 60° C. and drawn transversely to a draw ratio of around 5.1× and then was heat set at 157° C., followed by a small strain reduction resulting in a final nominal draw ratio of about 5.0, before slitting and winding into a roll of film F20.

The film release behavior on the release layer side was characterized using a 3-day conditioning at 50° C. with both "845" and "810" tape. The peel forces were very high for the cast films F19 at 3.60 N/cm (33.0 oz/in) and 2.66 N/cm (24.4 oz/in) for the "845" and "810" tapes respectively. In contrast, the oriented film F20 had only moderate peel forces of 1.13 N/cm (10.4 oz/in) and 1.47 N/cm (13.5 oz/in) and 1.13 N/cm (10.4 oz/in), high re-adhesions of 3.29 N/cm (30.2 oz/in) and 1.97 N/cm (18.1 oz/in), and relative peel factors of 0.34 and 0.74 for these "845" and "810" tapes, respectively.

Oriented Film Examples (F21, F22, F23)

Example films F21, F22 and F23 were cast using the same materials and processes as those of Example F19 but using different compositions in the release layer while maintaining mixture A in the substrate layer. The cast films were furthermore stretched uniaxially using a KARO™ IV Laboratory Biaxial Stretching Device (available from Brueckner, Portsmouth, NH, USA) as the same procedures. The films were pre-heated for 120 second and then stretched at the pre-heat temperature of 78° C. and a 10%/sec initial rate to a final draw ratio of about 5.8×, relaxed to a draw ratio of 5.6× and then finally heat set at 155° C. The resulting films achieved high orientation as shown by their draw direction refractive index of 1.470 for each film composition. Table E provides the weight % compositions (as referenced using the same labels as Examples F14-F19) and the release results of the release layer side using a 3-day conditioning at 50° C. with "810" and "845" tape:

| Film Example | Composition (wt %) | | | | Peel Force 3M 810 oz/in | Peel Force 3M 810 N/cm | Peel Force 3M 845 oz/in | Peel Force 3M 845 N/cm |
|---|---|---|---|---|---|---|---|---|
| ID | PLA | PVAc | HG | PO | | | | |
| F21 | 79% | 10% | 6% | 5% | 6.2 | 0.68 | 9.3 | 1.01 |
| F22 | 74% | 15% | 6% | 5% | 12.3 | 1.34 | 15.1 | 1.64 |
| F23 | 74% | 9% | 12% | 5% | 6.4 | 0.69 | 11.2 | 1.22 |

The re-adhesion values are anticipated to be similar to those for Example F20; hence the relative peel factors for these films are estimated for the "810" as 0.34, 0.68 and 0.35 for films F21, F22 and F23 respectively, and for the "845" tape as 0.31, 0.50 and 0.37 for films F21, F22 and F23 respectively.

Blown Film Example F24

A five-layer coextruded blown film F24 was made comprising two release layers, two substrate layers and one inner core carrier layer. In this manner, one release layer was the skin layer inside the blown bubble and the other release layer was the skin outside the blown bubble. The substrate layers resided between the release and the core layers. The substrate was formed using identical materials and weight % as mixture A in the substrate layers of examples F14-F23. The release layer used the identical materials as the release layers of examples F14-F23, except that the composition was 74 wt. % PLA, 11 wt. % PVAc, 7.5% Plasticizer and 7.5% Release. This is henceforth referred to as "mixture B." The inner core carrier layer comprised Dow LDPE 611A (available from Dow Chemical, Midland, MI, USA).

The release and re-adhesion were measured on each of the release surfaces of this blown film. For the outermost skin, resulting peel and re-adhesion were 0.42 and 2.38 N/cm (3.9 and 21.8 oz/in), resulting in a relative peel factor of 0.18, using the 810 tape; and 0.65 and 3.52 N/cm (6.0 and 32.3 oz/in), resulting in a relative peel factor of 0.19, using the 845 tape. For the innermost skin, the resulting peel and re-adhesion were 0.77 and 3.56 N/cm (7.1 and 32.7 oz/in), resulting in a relative peel factor of 0.22, for the 845 tape.

Blown Film Examples (F25, F26)

Two three-layer blown films F25 and F26 were coextruded comprising a release layer (the skin layer outside the bubble), a substrate layer and a carrier layer (the skin layer inside the bubble). The substrate layer was identical to mixture A of Examples F14-F24. The carrier layer comprised Dow™ LDPE 611A (available from Dow Chemical, Midland, MI, USA). The release layer of each film were identical in composition to mixture B of Example F24; however, PeelOil™ 1010 s was replace by "Release Material C" in example film F25 and PeelOil™ 1010 s was replace by "Release Material D" in example film F26, again at the same 7.5 wt. % loading.

Release Material C was prepared as follows. To a 5000 mL flask fitted with mechanical stirring, thermostatic heating and a reflux condenser was added 150 g of poly(vinyl alcohol-co-ethylene) with 44 mol % ethylene content (available from Aldrich Chemical, Milwaukee, WI) and 2069 g of N-methyl pyrrolidone. The headspace was flushed with nitrogen and a positive pressure of nitrogen was maintained on the headspace while the mixture was heated to 135° C. Octadecyl isocyanate (available from Hodogaya Chemical Co Ltd, White Plains, NY—manufactured in Japan—as Millionate O) was filtered to remove urea. Slowly added 592.3 g of the resulting clear liquid to the initial mixture. Continued heating the mixture at 135° C. for 48 hours, then the mixture was cooled to ambient temperature (approximately 23° C.). The resulting solids were collected by filtration, washed four times with about 1000 ml of methanol then dried at 30° C. in an oven over night (>12 hours). Resulted 936 g of a beige solid.

Release Material D was prepared as follows. To a 5000 mL flask fitted with mechanical stirring, thermostatic heating and a reflux condenser was added 85 g of poly(vinyl alcohol-co-ethylene) with 27 mol % ethylene content (available from Aldrich Chemical, Milwaukee, WI) and 2090 g of N-methyl pyrrolidone. The headspace was flushed with nitrogen and a positive pressure of nitrogen was maintained on the headspace while the mixture was heated to 135° C. Octadecyl isocyanate (available from Hodogaya Chemical Co Ltd, White Plains, NY—manufactured in Japan—as Millionate O) was filtered to remove urea. Slowly added 437.6 g of the resulting clear liquid to the initial mixture. Continued heating the mixture at 135° C. for 42 hours, then the mixture was cooled to ambient temperature (approximately 23° C.). The resulting solids were collected by filtration, washed four time with about 1000 ml of methanol then dried at 30° C. in an oven over night (>12 hours). Resulted in about 500 g of a pale beige solid.

The release results are summarized in Table E for the "810" and "845" tapes, for samples conditioned over 3 days at 50° C.:

| Film Example ID | Peel Force "810" oz/in | Peel Force "810" N/cm | Re-adhesion Force "810" oz/in | Re-adhesion Force "810" N/cm | Relative Peel Factor (RPF) "810" | Peel Force "845" oz/in | Peel Force "845" N/cm | Re-adhesion Force "845" oz/in | Re-adhesion Force "845" N/cm | Relative Peel Factor (RPF) "845" |
|---|---|---|---|---|---|---|---|---|---|---|
| F25 | 15.0 | 1.63 | 26.0 | 2.83 | 0.58 | 9.4 | 1.03 | 27.3 | 2.97 | 0.35 |
| F26 | 15.3 | 1.67 | 20.9 | 2.28 | 0.73 | 5.6 | 0.62 | 16.8 | 1.83 | 0.34 |

Oriented Blown Film Examples (F27, F28)

Portions of blown films F25 and F26 were furthermore stretched and oriented, to create examples F27 and F28, respectively, using the method and condition of examples F21-23, except that the total uniaxial draw ratio was set to 3.0. After stretching and heat setting, the films exhibited a high degree of orientation with TD (stretch direction) refractive indices of approximately 1.47 (at 633 nm) as measured on the non-release substrate side of the films.

The release and re-adhesion were measured on each of the release surfaces of these oriented blown films. For example F27, the resulting peel and re-adhesion were 1.44 N/cm (13.2 oz/in) and 3.55 N/cm (32.6 oz/in), resulting in a relative peel factor of 0.40, using the 810 tape; and 1.11N/cm (10.2 oz/in) and 3.9 N/cm (35.8 oz/in), resulting in a relative peel factor of 0.29, using the 845 tape. For example F28, the resulting peel and re-adhesion were 2.61 N/cm (23.9 oz/in) and 3.06 N/cm (28.0 oz/in), resulting in a relative peel factor of 0.85, using the 810 tape; and 0.85 N/cm (7.8 oz/in) and 3.18 N/cm (29.1 oz/in), resulting in a relative peel factor of 0.27, using the 845 tape.

What is claimed is:

1. A composition comprising
at least 50 wt. % of semicrystalline polylactic acid polymer and 1 wt. % to 25 wt. % of a copolymer that lacks silicone-containing moieties, wherein the copolymer is a copolymer of ethylene vinyl acetate and polyvinyl alcohol and the copolymer comprises pendent C12-C30 alkyl groups.

2. The composition of claim 1 wherein the composition comprises C12-C30 alkyl moieties in an amount up to 15 wt. % of the composition.

3. A film or film layer comprising the composition of claim 1.

4. The film or film layer of claim 3 wherein the film or film layer is oriented.

5. The film or film layer of claim 4 wherein the oriented film or film layer has a 180 Degree Peel Adhesion less than the same unoriented film.

6. The film or film layer of claim 3 wherein the film or film layer has a relative peel factor of less than 1.

7. A multilayer film comprising a film layer according to claim 3 disposed on a preformed film substrate or core film layer.

8. The multilayer film of claim 7 wherein the preformed film substrate or core film layer comprises a biobased material.

9. The multilayer film of claim 7 wherein the preformed film substrate layer or core film layer comprises a polylactic acid polymer.

10. The film or film layer of claim 3 wherein the film or film layer is a release layer of an adhesive article.

11. The film or film layer of claim 3 wherein the film or film layer is a release layer of a pressure sensitive adhesive article.

12. A method of making a film or film layer comprising melt extrusion of the composition of claim 1.

13. The method of claim 12 wherein the film or film layer is cast from a die either directly onto a chill wheel or blown and then quenched.

14. The composition of claim 1 wherein the composition comprises less than 10 wt. % of starch.

15. The composition of claim 1 wherein the composition comprises less than 10 wt. % of organic biomaterial filler.

16. The composition of claim 1 wherein the copolymer further comprises fluorine atoms.

17. The composition of claim 1 wherein the copolymer lacks fluorinated moieties.

* * * * *